(12) United States Patent
Fujita et al.

(10) Patent No.: US 11,327,371 B2
(45) Date of Patent: May 10, 2022

(54) LIQUID CRYSTAL DISPLAY DEVICE

(71) Applicant: Japan Display Inc., Tokyo (JP)

(72) Inventors: Takafumi Fujita, Tokyo (JP); Seiji Furumoto, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 48 days.

(21) Appl. No.: 16/904,599

(22) Filed: Jun. 18, 2020

(65) Prior Publication Data

US 2020/0400993 A1    Dec. 24, 2020

(30) Foreign Application Priority Data

Jun. 20, 2019 (JP) .............................. JP2019-114716

(51) Int. Cl.
*G02F 1/1345* (2006.01)
*G09G 3/36* (2006.01)

(52) U.S. Cl.
CPC ....... *G02F 1/13452* (2013.01); *G09G 3/3648* (2013.01); *G09G 2300/0857* (2013.01); *G09G 2310/06* (2013.01); *G09G 2330/021* (2013.01)

(58) Field of Classification Search
CPC .............. G02F 1/13452; G09G 3/3648; G09G 2300/0857; G09G 2310/06; G09G 2330/021

USPC .................................................. 349/149–152
See application file for complete search history.

(56) References Cited

U.S. PATENT DOCUMENTS

| 2015/0222032 A1* | 8/2015 | Goo ..................... G02F 1/13452 |
| | | 361/748 |
| 2017/0124973 A1 | 5/2017 | Nakao et al. |
| 2018/0025685 A1* | 1/2018 | Wang .................... G09G 3/2092 |
| | | 345/214 |

FOREIGN PATENT DOCUMENTS

JP        2017-083768 A       5/2017

* cited by examiner

*Primary Examiner* — Charles S Chang
(74) *Attorney, Agent, or Firm* — Xsensus LLP

(57) ABSTRACT

According to one embodiment, a relay substrate provided between a liquid crystal panel and a controller includes first connectors. The controller includes a microcomputer and second connectors. The relay substrate and the controller include a line pattern to form a test circuit which feeds a test signal back to an input pin of the microcomputer from an output pin of the microcomputer, and which transfers the test signal between the controller and the relay substrate in each pair of the first connectors and the second connectors. The microcomputer outputs the test signal from the output pin, and determines a connecting state of the cables that connect the relay substrate and the controller based on a state of feedback of the test signal to the input pin.

7 Claims, 15 Drawing Sheets

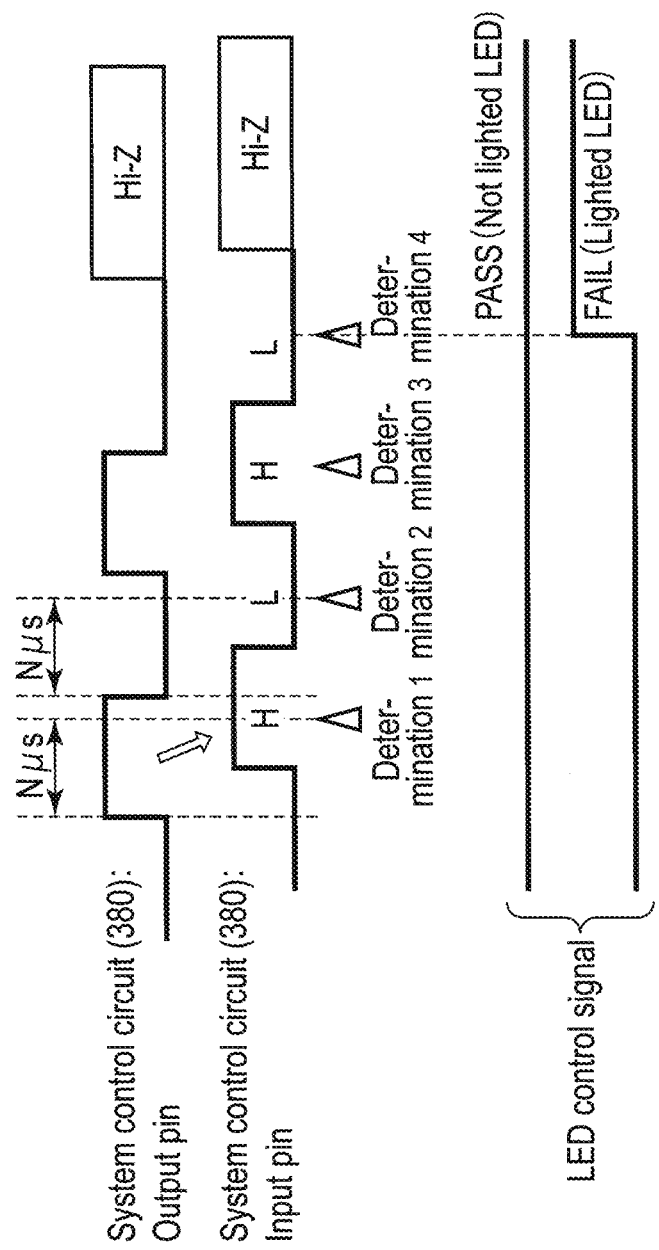
F I G. 4

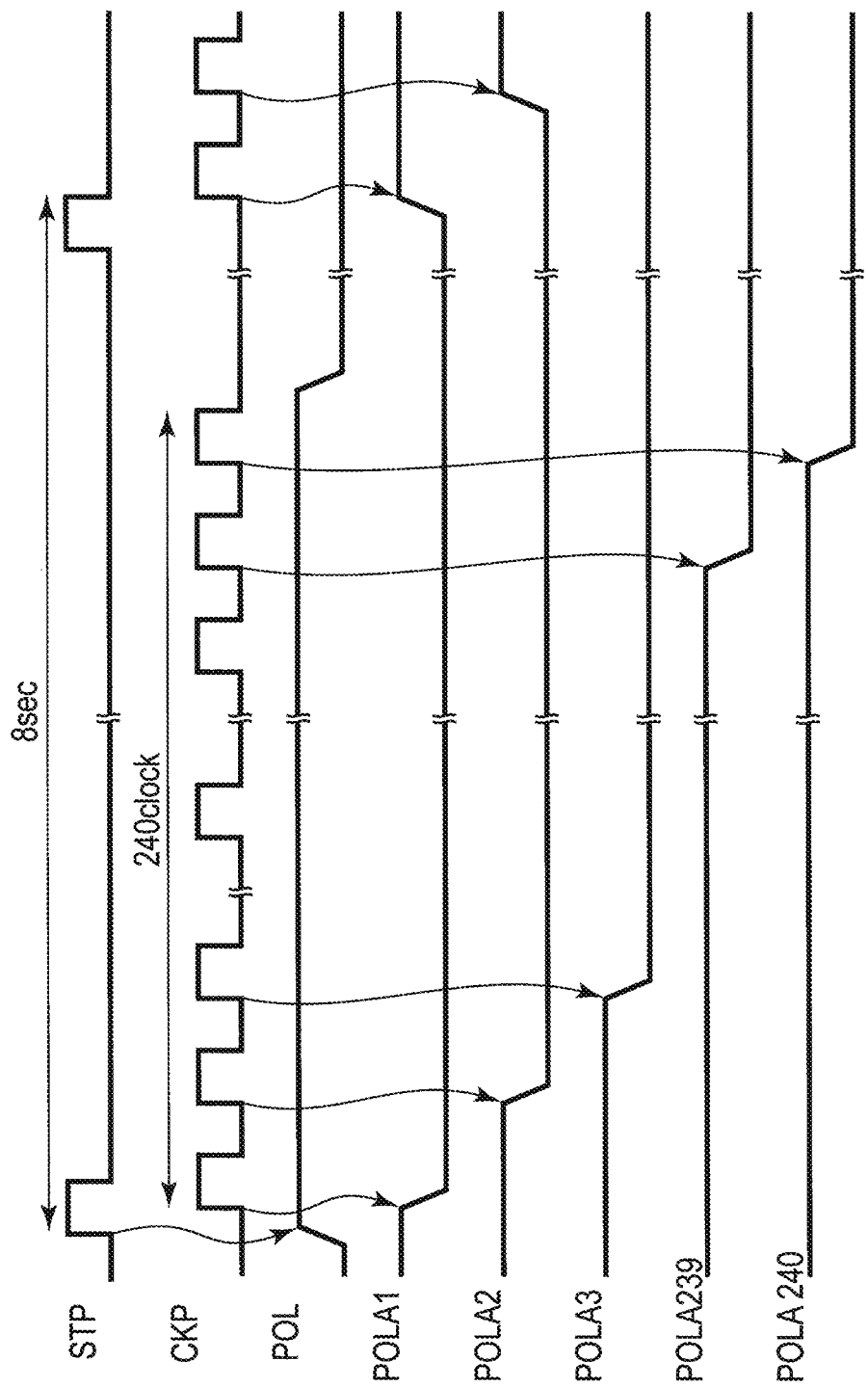
F I G. 11

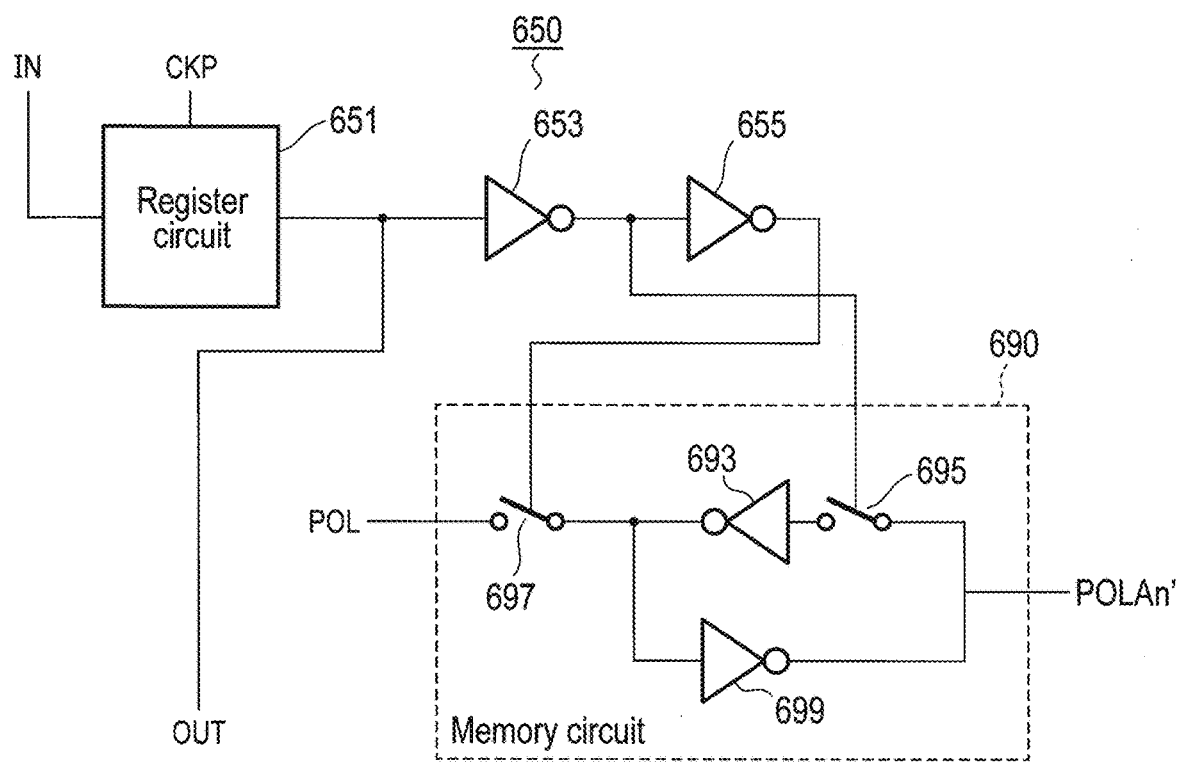
F I G. 12
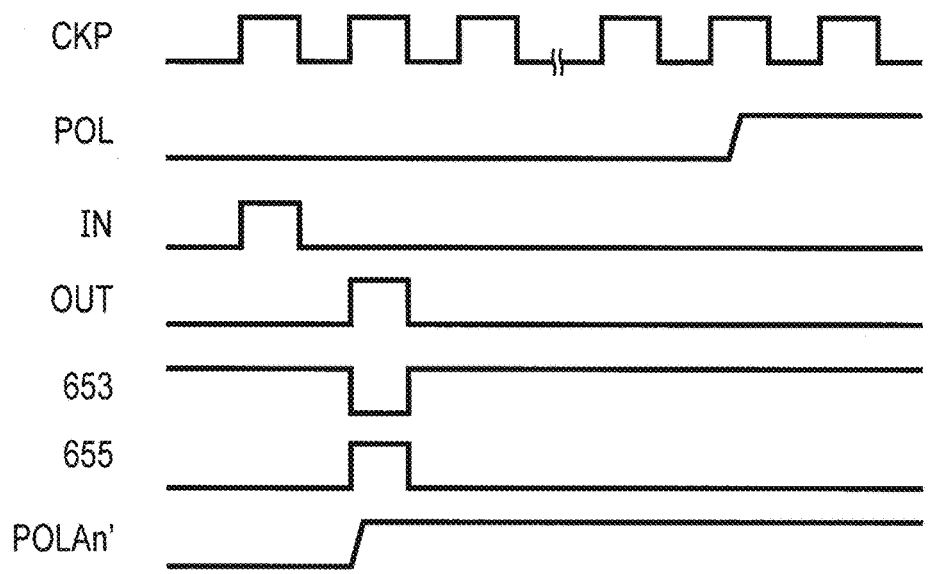
F I G. 13

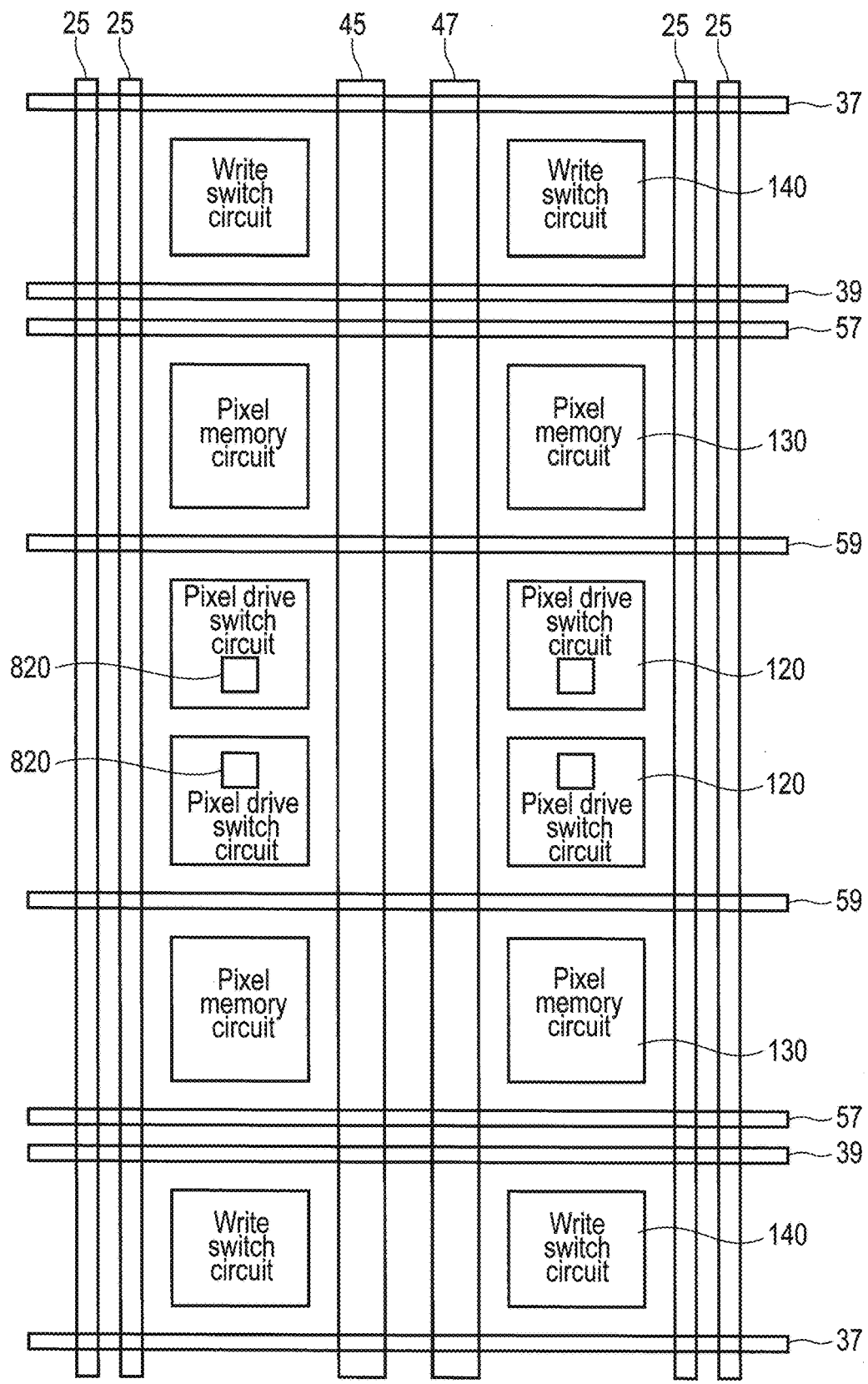
F I G. 14

LIQUID CRYSTAL DISPLAY DEVICE

CROSS-REFERENCE TO RELATED APPLICATIONS

This application is based upon and claims the benefit of priority from Japanese Patent Application No. 2019-114716, filed Jun. 20, 2019, the entire contents of which are incorporated herein by reference.

FIELD

Embodiments described herein relate generally to a liquid crystal display device.

BACKGROUND

Liquid crystal panels such as memory in pixel (MIP) liquid crystal have recently started to become widespread. The liquid crystal panels are excellent in low power consumption because their pixels each have a memory and an image can be displayed using video signals stored in the memory to display a still image or the like.

In a display device equipped with a liquid crystal panel, the liquid crystal panel may be connected to a controller that controls the liquid crystal panel, via a relay substrate or the like. The relay substrate and the controller may also be connected to each other via a plurality of cables such as flat flexible cables. In this case, the manufacturing process of the display device requires a step of connecting one end of a cable to the connector on the relay substrate side and connecting the other end of the cable to the connector on the controller side.

In the above display device, when the liquid crystal panel is to be turned on with part of the cable not connected due to an error in the step of connecting the cable to the connector, it may cause its lighting failure and may be damaged accordingly.

BRIEF DESCRIPTION OF THE DRAWINGS

FIG. 4 is a timing chart of an FFC connection test in the display device of the embodiment.

FIG. 11 is a polarity signal timing chart in the display device of the embodiment.

FIG. 12 is a diagram showing a polarity signal shift register and a memory circuit in the display device of the embodiment.

FIG. 13 is a timing chart of the polarity signal shift register and the memory circuit in the display device of the embodiment.

FIG. 14 is a diagram showing a first example of circuits around pixels of the display device of the embodiment.

DETAILED DESCRIPTION

Figure 1:
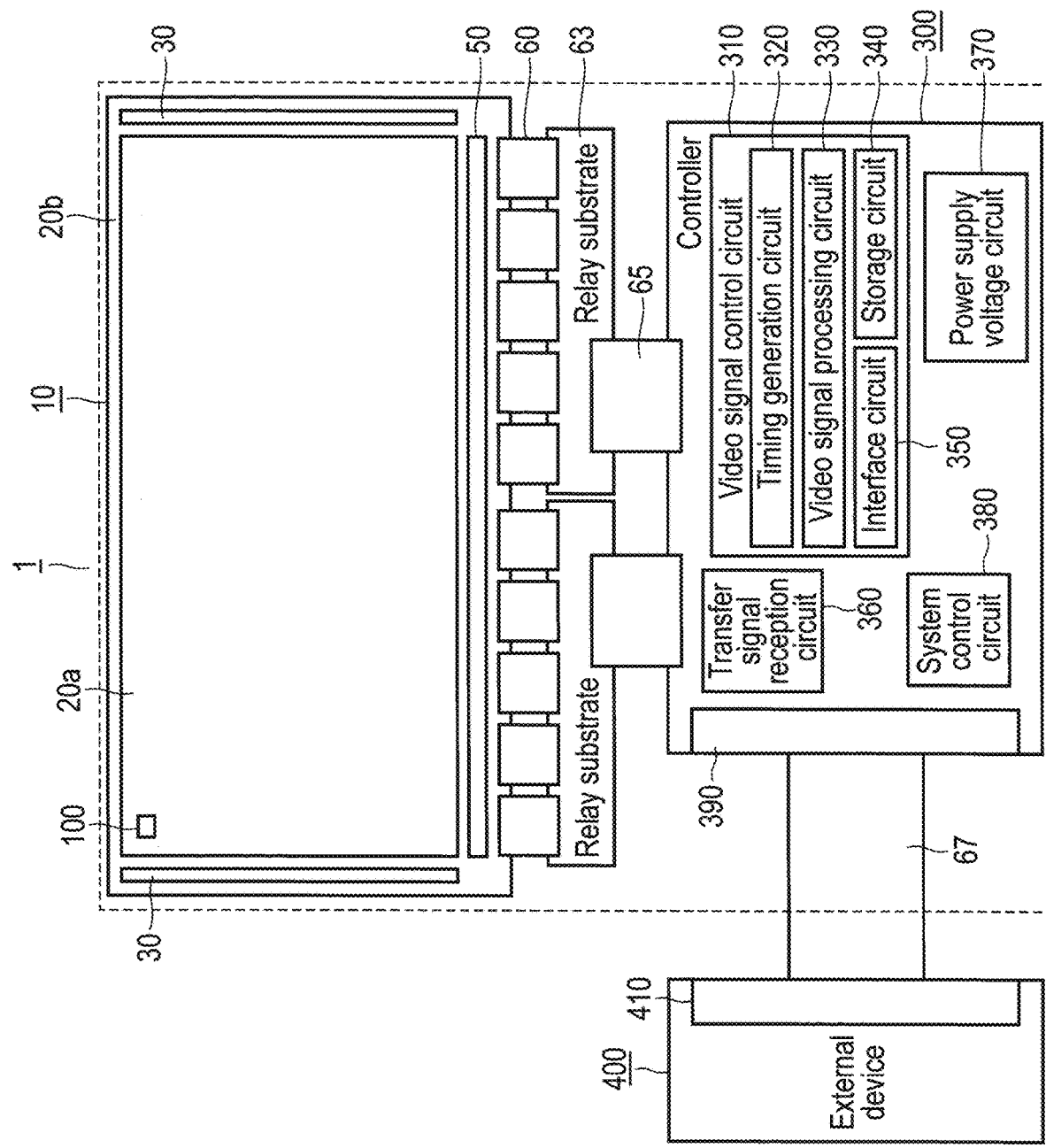
FIG. 1 is an overall system diagram of a display device of the embodiment.

Embodiments will be described hereinafter with reference to the accompanying drawings.

In general, according to one embodiment, a liquid crystal display device includes a liquid crystal panel, a controller, and a relay substrate. The controller is configured to control the liquid crystal panel. The relay substrate is provided between the liquid crystal panel and the controller. The relay substrate and the controller are connected by a plurality of cables. The relay substrate includes a plurality of first connectors, and one end of the cables is connected to the plurality of first connectors. The controller includes a microcomputer, and a plurality of second connectors. The plurality of second connectors are paired with the first connectors, and the other end of each of the cables is connected to the plurality of second connectors. The relay substrate and the controller include a line pattern to form a test circuit which feeds a test signal back to an input pin of the microcomputer from an output pin of the microcomputer, and which transfers the test signal from the controller to the relay substrate and returns the test signal from the relay substrate to the controller in each pair of the first connectors and the second connectors. The microcomputer is configured to output the test signal from the output pin, and to determine a connecting state of the cables that connect the relay substrate and the controller based on a state of feedback of the test signal to the input pin.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is an overall system diagram of a display device 1 of the present embodiment.

The display device 1 includes a liquid crystal display panel 10 and a controller 300 which controls and drives the liquid crystal display panel 10.

The liquid crystal display panel 10 includes a display area 20a for displaying an image and a frame-shaped non-display area 20b surrounding the display area 20a (an area located around the display area 20a). In the display area 20a of the liquid crystal display panel 10, a plurality of pixels 100 are arranged in a matrix, for example. Each of the pixels 100 includes a switching element. A thin film transistor (TFT) is used as the switching element. Each of the pixels 100 has a configuration employing a memory-in-pixel (MIP) system including a memory circuit capable of storing a video signal (data signal), and includes, for example, a reflecting electrode in addition to the memory circuit. The display device 1 is called a reflective display device with a built-in memory, and is known as one with low power consumption because it requires no backlight and displays a still image and the like using data stored in the memory circuit.

Reference numeral 30 denotes scanning signal output units which are electrically connected to the gate electrode of a switching element included in each of the pixels 100 via a scanning line. The scanning signal output units 30 output a scanning signal to write a video signal to the pixels 100. Reference numeral 50 denotes a video signal output unit which is electrically connected to the source electrode of a switching element included in each of the pixels 100 via a video signal line. The video signal output unit 50 outputs a video signal and a display control signal to a display area 20. Note that the drain electrode of the switching element included in each of the pixels 100 is electrically connected to a memory circuit to be described later.

Reference numeral 60 denotes a flexible printed circuit (FPC) which connects a relay substrate 63 to the liquid crystal display panel 10. The relay substrate 63 is divided into two right and left substrates, and supplies a signal, a power supply voltage, and the like to the liquid crystal display panel 10 from the controller 300 via a flat flexible cable (FFC) group 65. That is, it is assumed in the display device 1 of the present embodiment that the relay substrate 63 and the controller 300 are connected to each other using a plurality of FFCs and a plurality of connectors (which are provided in pairs on the relay substrate 63 and the controller 300). The manufacturing process of the display device 1 therefore includes a step of connecting the FFCs to the FFC connectors.

When the liquid crystal display panel 10 is to be turned on with part of the FFC not connected due to an error in the step of connecting the FFC to the FFC connector, it may cause its lighting failure and may be damaged accordingly.

Therefore, the display device 1 of the present embodiment has the mechanism for determining a connecting state of a plurality of FFCs which connect the relay substrate 63 and the controller 300, to reduce the risk that the liquid crystal display panel 10 is damaged due to a connection failure of the FFCs.

The above mechanism (FFC connection test function) of the display device 1 will be described with reference to FIGS. 2 to 5. The FFCs which connect the relay substrate 63 and the controller 300 are exemplified here as a target whose connection state is to be determined. The mechanism is not limited to this but can be applied to, for example, a plurality of generally-used cables which connect the substrates.

Figure 2:
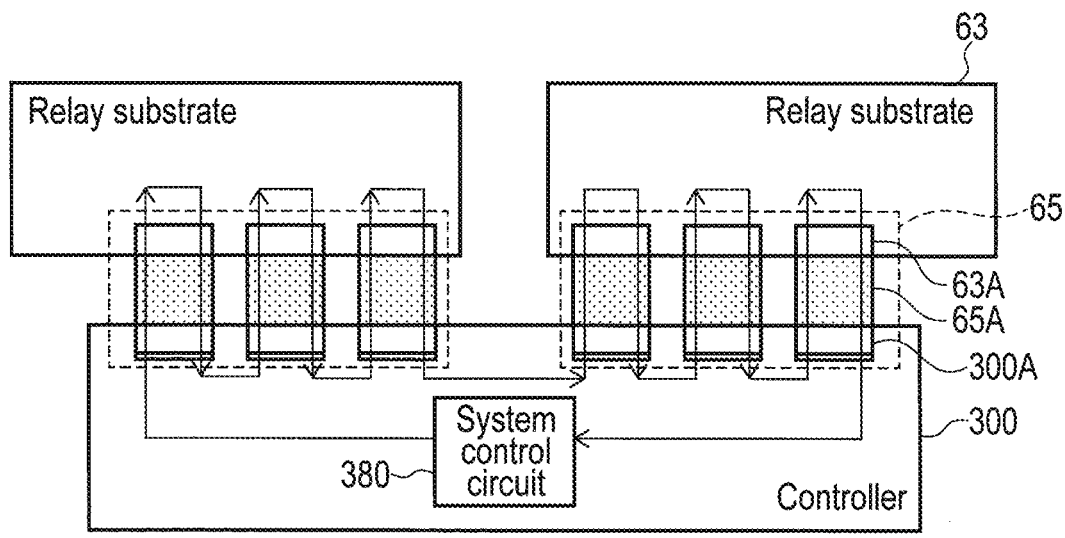
FIG. 2 is a diagram illustrating a line pattern formed on a relay substrate and a controller to fulfill a cable connection test function in the display device of the embodiment.

FIG. 2 is a diagram illustrating a line pattern formed on the relay substrate 63 and the controller 300 to fulfill the FFC connection test function. FIG. 2 shows a system control circuit 380, the principal function of which will be described later. It is assumed here that the system control circuit 380 is a micro controller (MCU) capable of inputting and outputting a pulse waveform.

As shown in FIG. 2, the relay substrate 63 includes a plurality of connectors 63A to which one end of each FFC 65A is connected. The controller 300 includes a plurality of connectors 300A to which the other end of the FFC 65A is connected. There is a one-to-one correspondence between the connectors 300A and the connectors 63A on the relay substrate 63.

The relay substrate 63 is provided with a line pattern in which a head pin (to which one of the signal lines arranged in line in the FFC 65A, located at one end of the FFC 65A, is connected) and a last pin (to which one of the signal lines, located at the other end of the FFC 65A, is connected) are connected to each other for each of the connectors 63A. The controller 300 is provided with (1) a line pattern in which the output pin of the controller 300 and the head pin of the head one of the connectors 300A are connected to each other; (2) a line pattern in which the head and last pins of continuous two of the connectors 300A are connected to each other; and (3) a line pattern in which the last pin of the last one of the connectors 300A and the input pin of the controller 300 are connected to each other.

If the FFCs 65A are connected to the connectors 63A on the relay substrate 63 and the connectors 300A on the controller 300 by forming the above line patterns on both the relay substrate 63 and the controller 300, a circuit which feeds the pulse waveform output from the controller 300 back to the controller 300, namely, a test circuit which transfers a pulse waveform from the controller 300 toward the relay substrate 63 and returns the pulse waveform from the relay substrate 63 toward the controller 300 in each pair of connectors 63A and 300A, is formed. That is, what is called a single-stroke circuit is formed.

Figure 3:
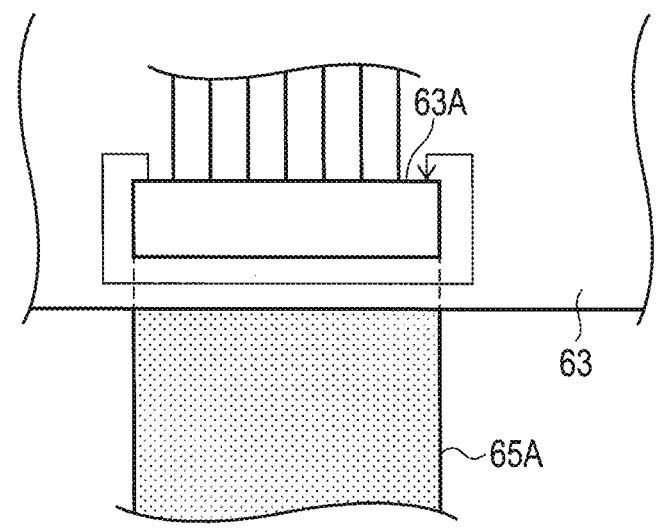
FIG. 3 is a diagram showing an example of a line pattern formed on a relay substrate to fulfill a cable connection test function in the display device of the embodiment.

It is imagined from FIG. 2 that the line pattern for connecting the head and last pins of the connector 63A on the relay substrate 63 is formed across an intermediate pin from the head pin to the last pin. However, the line pattern is preferably formed to bypass the intermediate pin as shown in FIG. 3, for example.

In each pair of connectors 63A on the relay substrate 63 and connectors 300A on the controller 300, a signal line for transferring a pulse waveform from the controller 300 to the relay substrate 63 and a signal line for returning the pulse waveform from the relay substrate 63 to the controller 300 do not necessarily need both-end signal lines of the signal lines arranged in line in the FFC 65A. However, it is preferable to use the signal lines at both ends of the FFC 65A because the signal lines at both ends of the FFC 65A are brought into its unconnected state in most cases.

The FFC connection test function of the display device 1 of the present embodiment for determining a connecting state of the FFCs 65A by the test circuit formed as described above, will be described below with reference to FIGS. 4 and 5.

FIG. 4 is a timing chart of an FFC connection test.

First, the system control circuit 380 outputs an optional pulse waveform from the output pin as a test signal. Then, the system control circuit 380 refers to the logic of the input pin that receives an optional pulse waveform that is expected to be fed back by the test circuit with a specific timing (after N μs such as 100 μs). The system control circuit 380 compares the logic of voltage level of the optional pulse waveform output from the output pin and the logic of the referred input pin to check whether the logics coincide with each other. If the logics coincide, the system control circuit 380 determines that all of the FFCs 65A are normally connected. If they do not coincide, the system control circuit 380 determines that at least one of the FFCs 65A is not connected.

The system control circuit 380 repeats the FFC connection test four times, for example. The system control circuit 380 determines that there is no failure in the FFC connection when the logics of the input and output pins coincide all four times, and determines that there is a failure in the FFC connection when the logics do not coincide even one time. When the system control circuit 380 determines that there is a failure in the FFC connection, it shifts the display device 1 to a shutdown mode to shut down the display device 1 urgently.

In accordance with the shift to the shutdown mode, the system control circuit 380 turns off the power of the liquid crystal display panel 10 and then shifts to a state in which an external command is not accepted. When the system control circuit 380 shuts down the display device 1 urgently in the shutdown mode, it turns on, for example, a light emitting diode (LED) provided on the external wall of the controller 300. The LED is turned on to report a connection failure of the FFC.

Figure 5:
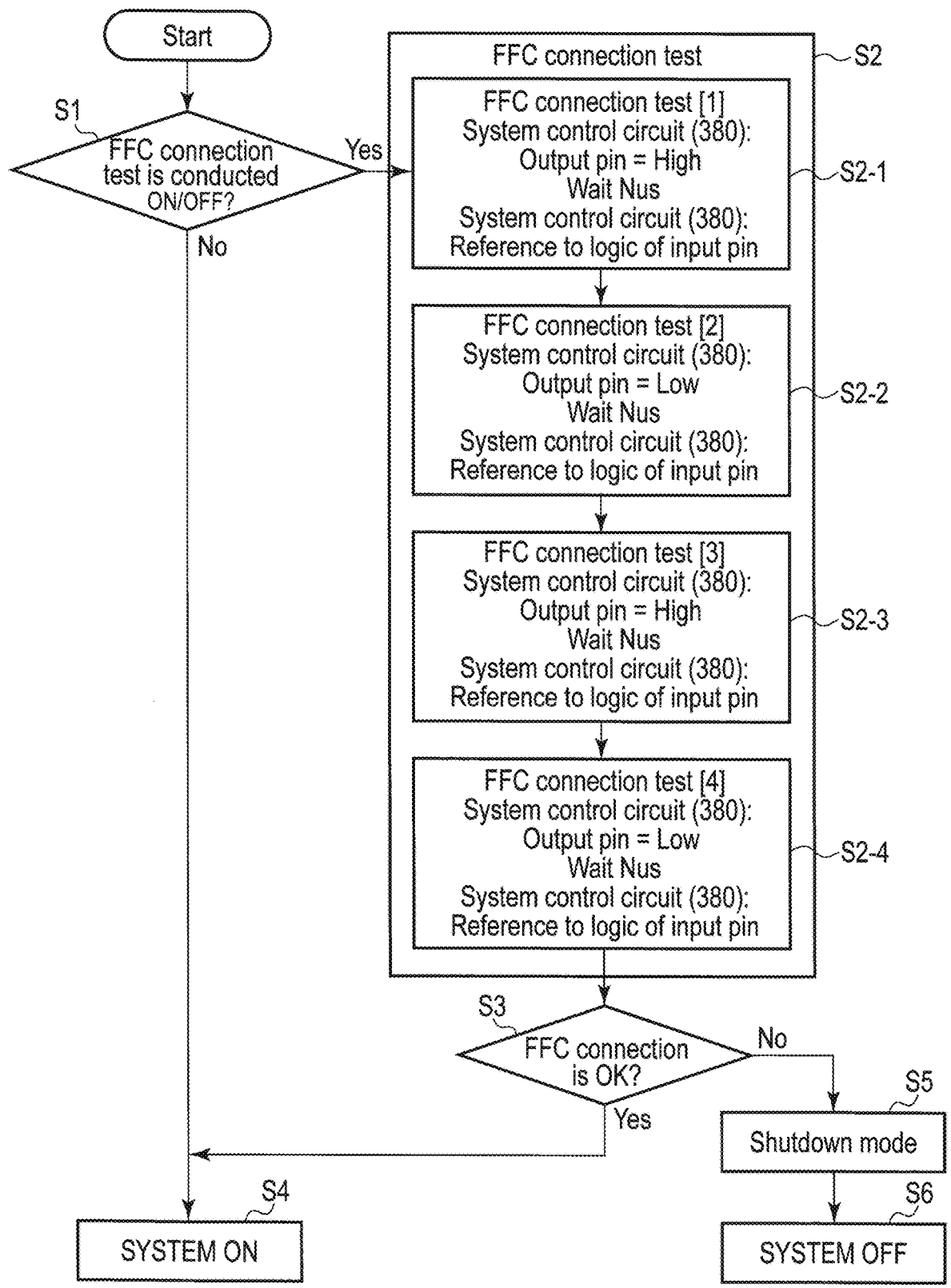
FIG. 5 is a flowchart showing a procedure of an FFC connection test function of the display device of the embodiment.

FIG. 5 is a flowchart showing a procedure of the FFC connection test function.

When the display device 1 is set to conduct an FFC connection test at startup (Yes in step S1), the system control circuit 380 conducts the FFC connection test prior to the startup (step S2). More specifically, the system control circuit 380 repeats, a predetermined number of times, outputting an optional pulse waveform from the output pin as a test signal, referring to the logic of the input pin that receives an optional pulse waveform that is expected to be fed back by the test circuit with a specific timing (after N μs), and checking whether the logics of the input and output pins coincide (steps S2-1 to S2-4).

When the system control circuit 380 determines that the FFC connection is normal under the FFC connection test (Yes in step S3), it starts up (step S4). When the system control circuit 380 determines that the FFC connection is not normal (No in step S3), it shifts the display device 1 to the shutdown mode (step S5) to shut down the display device 1 urgently (step S6).

When the system control circuit 380 is not set to conduct the FFC connection test (No in step S1), it starts up without conducting the FFC connection test (step S4).

Since the display device 1 of the present embodiment has the mechanism for determining a connecting state of the FFCs that connect the relay substrate 63 and the controller 300 as described above, it is possible to reduce the risk that the liquid crystal display panel 10 is damaged due to a connection failure of the FFCs. That is, it is possible to provide a liquid crystal display device capable of determining a connecting state of the cables that connect substrates, for example.

Referring back to FIG. 1, each of the components of the display device 1 will be described.

The controller 300 processes signals sent from an external device 400 so as to be adaptable to the liquid crystal display panel 10, and supplies video signals and timing signals to the liquid crystal display panel 10.

The controller 300 includes a video signal control circuit 310, a transfer signal reception circuit 360, a power supply voltage circuit 370 and a system control circuit 380. The video signal control circuit 310 includes a timing generation circuit 320, a video signal processing circuit 330, a storage circuit 340 and an interface circuit 350.

The controller 300 is provided with a power supply voltage, a video signal and a control signal from the external device 400 via a cable 67. The cable 67 is connected to the external device 400 through a connector 410, and is connected to the controller 300 through a connector 390.

A general video signal sent from the external device 400 corresponds to a pixel composed of three sub-pixels of red, green and blue, and represents the gradation of each color by digital data of 6 bits or more. In the display device 1 of the present embodiment, which is a reflective display device with a built-in memory, the sub-pixels are composed of n colors (n is three or more), and the number of bits representing gradation is m bits (m is six or less).

Therefore, the controller 300 processes a video signal, a power supply voltage and a control signal, which are adaptable to the display device 1 of the present embodiment, based on a general video signal, a power supply voltage and a control signal which are externally transmitted, and supplies the processed signals to the liquid crystal display panel 10.

In the present embodiment, the number of colors of the sub-pixels is four and the number of bits representing the gradation is three. However, the number of colors is not limited to four or the number of bits is not limited to three.

The video signal control circuit 310 converts an externally transmitted video signal into a video signal that is adaptable to the reflective display device with a built-in memory, forms a timing signal necessary for display, and supplies it to the liquid crystal display panel 10.

The transfer signal reception circuit 360 receives an externally transmitted video signal that conforms to a standard such as LVDS for use in short-range high-speed transmission.

The power supply voltage circuit 370 generates a voltage required for the reflective display device with a built-in memory from a DC power supply voltage of, e.g., 12 V, which supplied from the outside.

The system control circuit 380 controls the transfer signal reception circuit 360 to receive a video signal from the outside, controls the video signal control circuit 310 to convert the video signal received by the transfer signal reception circuit 360, controls the power supply voltage circuit 370 to generate and supply a voltage required for the reflective display device with a built-in memory, and transmits and receives control signals to and from the external device 400 via the connector 390.

As features of the system control circuit 380, it supplies a timing signal necessary for display (which will be described in detail later) to the liquid crystal display panel 10 in addition to the fact that it controls the generally-used controller 300 as described above. The system control circuit 380 can use, for example, a micro control unit (MCU), and includes an input/output unit in addition to a CPU and a memory that stores programs. The system control circuit 380 can supply a timing signal necessary for display to the liquid crystal display panel 10 using the input/output unit.

The display device 1 of the present embodiment is a reflective display device with a built-in memory in which the pixels 100 each have a reflecting electrode and a memory circuit as described above, and has a drive mode using a signal from a controller in which the video signal control circuit 310 outputs a signal necessary for display (also referred to as a controller mode hereinafter) and a drive mode using a signal recorded in the memory circuit (also referred to as a memory mode hereinafter).

In the controller mode, the controller 300 transmits and receives a control signal to and from the system control circuit 380 through the interface circuit 350, stores the control signal and video signal in the storage circuit 340, converts the video signal in the video signal processing circuit 330 so as to be adaptable to the reflective display device with a built-in memory, and forms a timing signal necessary for display in the timing generation circuit 320.

In addition, the controller 300 supplies the video signal, power supply voltage and control signal to both the right and left sides of the liquid crystal display panel 10. The relay substrate 63 is divided into two for the right and left sides of the liquid crystal display panel 10, and five flexible printed circuits 60 are connected to the relay substrate 63 and the liquid crystal display panel 10. The liquid crystal display panel 10 is supplied with a signal necessary for display through the flexible printed circuits 60.

In the memory mode, the controller 300 stops the operations of the video signal processing circuit 330 and the like, and the system control circuit 380 outputs a timing signal required in the memory mode to the liquid crystal display panel 10.

Figure 6:
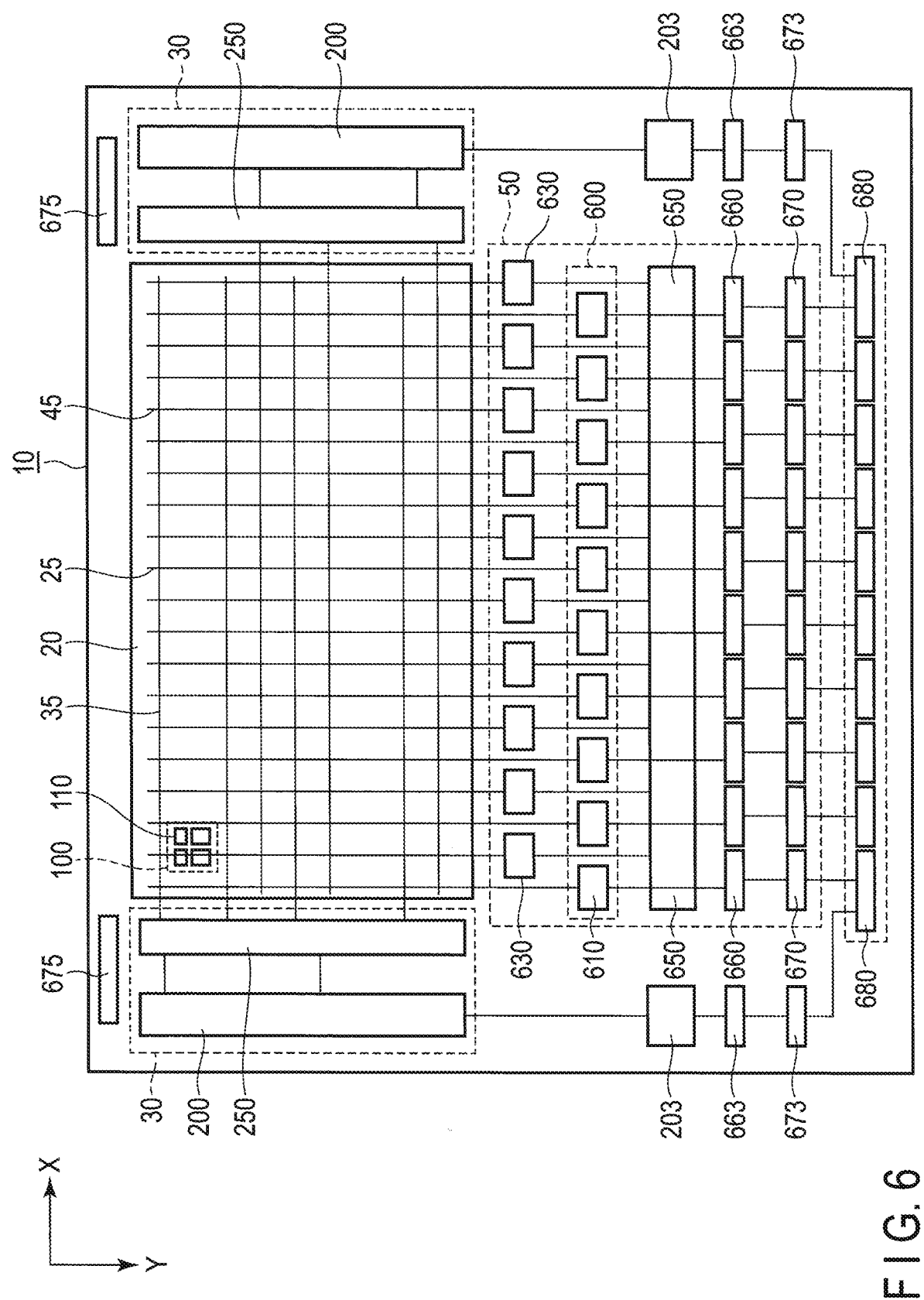
FIG. 6 is a detailed diagram of a liquid crystal display panel of the display device of the embodiment.

FIG. 6 is a block diagram of the liquid crystal display panel 10. As described above, the pixels 100 are arranged in a matrix in the display area 20. FIG. 6 shows only one pixel 100 in order to avoid complicating the drawing.

The pixels 100 are arranged in a matrix in the X-Y plane defined by the first direction X and the second direction Y. When the resolution of the liquid crystal display panel 10 is, for example, 1920×1080, 1920 pixels 100 are arranged in the first direction X, and 1080 pixels 100 are arranged in the second direction Y.

Each pixel 100 is a minimum unit that constitutes a color image. The pixel 100 includes a plurality of sub-pixels 110. In FIG. 6, the pixel 100 includes four sub-pixels 110, two of which are arranged in the first direction X and the other two of which are arranged in the second direction Y.

A plurality of scanning lines 35 are connected to the scanning signal output units 30 such that they are arranged in the second direction Y. The two scanning signal output units 30 are formed in the non-display area 20b and opposed to each other with the display area 20a between them. In this case, odd-numbered scanning lines 35 are connected to one of the scanning signal output units 30 and even-numbered scanning lines 35 are connected to the other scanning signal output unit 30. In other words, the scanning lines 35 are alternately connected to the two scanning signal output units 30.

The scanning signal output units 30 are formed on their respective right and left sides of the display area 20, and includes a scanning shift register 200 and a buffer circuit 250.

In response to a timing signal output from the scanning shift register 200, the buffer circuit 250 outputs scanning signals to the scanning lines 35. The scanning signals are output to the scanning lines 35 in sequence from the top to the bottom or from the bottom to the top in the drawing.

The scanning lines 35 the number of which is equal to the number of sub-pixels 110 arranged in the second direction Y, are connected to the scanning signal output units 30. It is assumed here that the pixel 100 includes four sub-pixels 110, two of which are arranged in the first direction X and the other two of which are arranged in the second direction Y as described above. Thus, the number of sub-pixels 110 arranged in the second direction Y is two. When the resolution of the liquid crystal display panel 10 is 1920×1080 as described above, the number of scanning lines 35 connected to the scanning signal output units 30 in the liquid crystal display panel 10 is 2×1080=2160.

The switching elements provided in the sub-pixels 110 are controlled by two signals whose polarities are inverted from each other, the details of which will be described later. In practice, therefore, each of the scanning lines 35 shown in FIG. 6 includes two signal lines for outputting the two signals. The two signal lines extend in the first direction X and are arranged in the second direction Y.

A plurality of video signal lines 25 are connected to the video signal output unit 50 such that they are arranged in the first direction X crossing the second direction Y. The video signal output unit 50 is formed under the non-display area 20b in the drawing.

The video signal output unit 50 includes a video signal output circuit 600, a polarity signal output circuit 630, a polarity signal shift register 650, a level shifter 660 and an electrostatic breakdown prevention circuit 670.

The video signal output circuit 600 outputs a video signal to the video signal lines 25. The polarity signal output circuit 630 outputs a polarity signal to polarity signal lines 45. The polarity signal shift register 650 outputs a timing signal indicating timing with which the polarity signal output circuit 630 outputs a polarity signal. The level shifter 660 converts the video signal into a voltage/current that can be driven by the video signal output circuit 600. The electrostatic breakdown prevention circuit 670 is a protection circuit provided at an input terminal 680 to prevent an electrostatic breakdown.

The video signal lines 25 the number of which corresponds to the number of sub-pixels 110 arranged in the first direction X and the number of bits representing the gradation of each color, are connected to the video signal output unit 50. It is assumed here that the pixel 100 includes four sub-pixels 110, two of which are arranged in the first direction X and the other two sub-pixels are arranged in the second direction Y. In one pixel, therefore, the number of sub-pixels 110 arranged in the first direction X is two. It is also assumed here that the number of bits representing the gradation for each color is three. The number of video signal lines 25 required for one sub-pixel 110 is therefore three. That is, in one pixel 100, the number of video signal lines 25 required for adjacent two sub-pixels 110 arranged in the first direction X is 2×3=6.

Accordingly, when the resolution of the liquid crystal display panel 10 is 1920×1080 as described above, the number of video signal lines 25 connected to the video signal output unit 50 in the liquid crystal display panel 10 is 6×1920=11520.

Note that the video signal lines 25 are each shared by adjacent sub-pixels 110 arranged in the second direction Y in one pixel 100.

In the liquid crystal display panel 10 shown in FIG. 6, video signals output to 11520 video signal lines 25 are transferred as serial data to the video signal output circuit 600, and the video signal output circuit 600 latches the serial data sent from the video signal control circuit 310 and outputs the latched serial data to the video signal lines 25.

The liquid crystal display panel 10 includes a latch circuit unit for each row of eight pixels. The video signal control circuit 310 sends video signals in serial for each of 48 (8 pixels×2 sub-pixel rows×3 bits) video signal lines 25.

The video signal output circuit 600 shown in FIG. 6 includes 10 blocks 610 each of which is composed of 24 latch circuit units. Accordingly, the video signal output circuit 600 has 11520 outputs of 48×24 units×10 blocks.

The polarity signal output circuit 630 outputs a polarity signal. The polarity signal prevents deterioration due to application of a DC voltage to a liquid crystal composition. As the polarity signal, a voltage whose polarity is inverted with respect to a reference voltage is supplied to the pixels 100 in a constant cycle.

The polarity signal shift register 650 outputs a timing signal to the polarity signal output circuit 630 so as to output the polarity signals in sequence without outputting them at once.

Reference numeral 203 denotes scanning timing signal generation units which generate timing signals for the scanning signal output units 30. Reference numeral 663 denotes level shifters for the scanning timing signal generation units 203, reference numeral 673 denotes electrostatic breakdown prevention circuits for the scanning timing signal generation units 203, and reference numeral 675 denotes electrostatic breakdown prevention circuits for the scanning signal output units 30.

Figure 7:
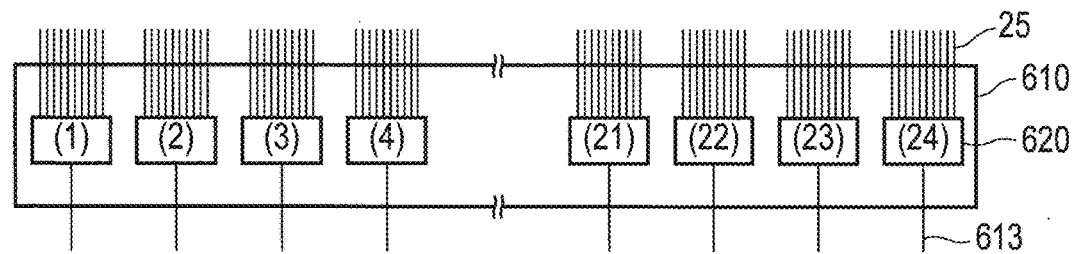
FIG. 7 is a block diagram of a latch circuit of the display device of the embodiment.

As described above, the video signal output circuit 600 includes a plurality of blocks 610, and each of the blocks 610 includes a plurality of latch circuit units 620 (see FIG. 7). In the present embodiment, the number of blocks 610 is 10 and the number of latch circuit units 620 is 24, but these numbers can optionally be selected according to the number of video signal lines 25 or the like.

FIG. 7 shows a block 610 including 24 latch circuit units 620. Each of the latch circuit units 620 outputs video signals to 48 video signal lines 25. Since the video signals are input as serial data from the video signal control circuit 310, one input line 613 is connected to its corresponding one of the latch circuit units 620.

Figure 8:
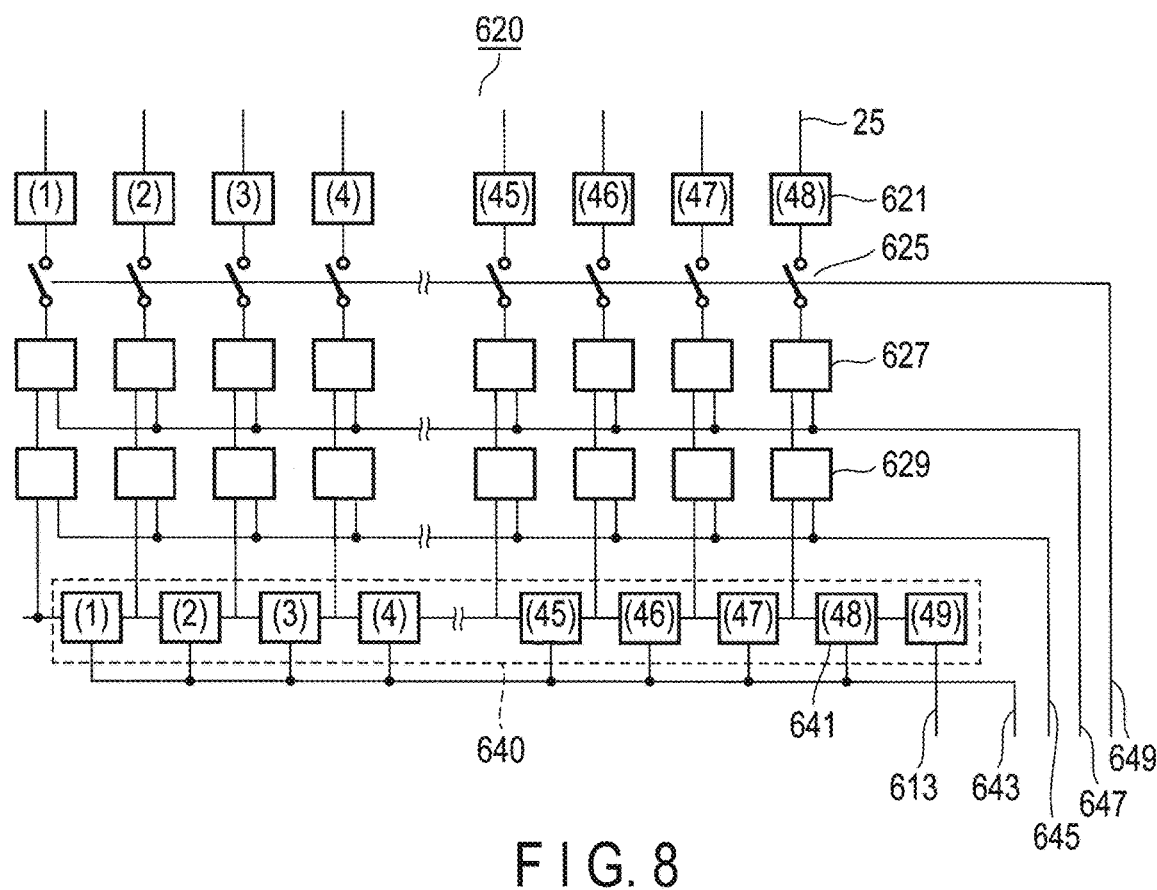
FIG. 8 is a diagram showing a latch circuit unit of the display device of the embodiment.

FIG. 8 shows a latch circuit unit 620. In the latch circuit unit 620, input lines 613 are connected to a shift register circuit 640 to which 49 latch circuits 641 are connected in series. The video signals input to the 49th latch circuit 641 are transferred in sequence in synchronization with a transfer clock supplied through a transfer clock line 643. When the 48 video signals are latched in the latch circuit 641, they are transferred simultaneously to a first-stage latch circuit 629 from the shift register circuit 640 in response to a first read signal supplied through a first read (load) signal line 645.

The video signals are transferred successively from the video signal control circuit 310. When the 48 video signals are latched again in the latch circuit 641, they are transferred simultaneously to the first-stage latch circuit 629 from the shift register circuit 640 in response to the first read signal supplied through the first read (load) signal line 645.

Before the second transfer of the video signals from the shift register circuit 640 to the first-stage latch circuit 629, the first-transferred 48 video signals are transferred from the first-stage latch circuit 629 to a second-stage latch circuit 627 in response to a second read signal supplied through a second read (load) signal line 647.

After the video signals are prepared for the first-stage and second-stage latch circuits 629 and 627, a write signal is supplied through a write signal line 649 to bring a switch circuit 625 into conduction, the video signals are transferred to a buffer circuit 621, and the video signals are written to the video signal line 25 via the buffer circuit 621.

In a generally-used display device, a video signal written to a video signal line is what is called an analog signal having a voltage corresponding to gradations to be displayed, whereas a video signal written to the video signal line 25 is what is called a digital signal having binary voltages. However, one of the binary voltages written to the video signal line 25 is a voltage capable of driving liquid crystal molecules or a voltage that is close to a voltage capable of driving liquid crystal molecules in the pixel 100.

That is, a voltage of about 10 V is used to drive liquid crystal molecules, and the video signals supplied to the pixel 100 are held in the memory circuit in the pixel 100. Since, however, there is no room to provide a level shifter in the pixel 100, a voltage capable of driving liquid crystal molecules or a voltage that is close to a voltage capable of driving liquid crystal molecules is used as the voltage supplied to the pixel 100.

Figure 9:
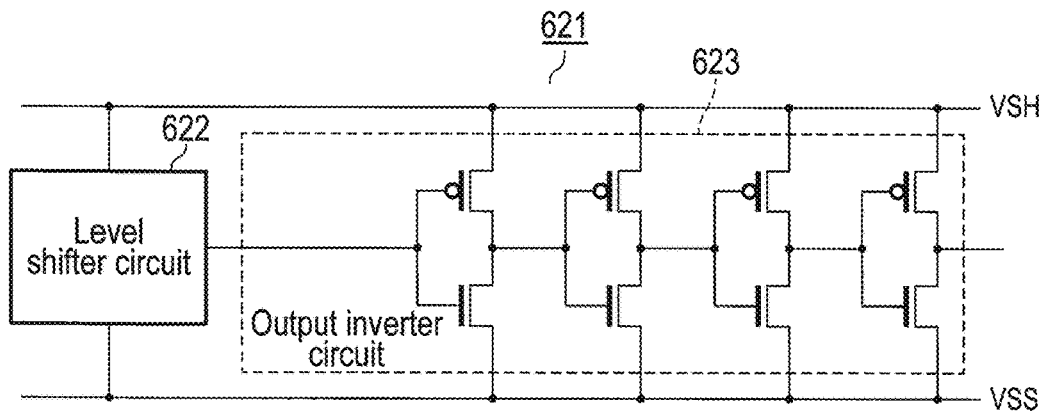
FIG. 9 is a diagram showing a buffer circuit of the display device of the embodiment.

As shown in FIG. 9, the buffer circuit 621 includes a level shifter circuit 622 and an output inverter circuit 623. The level shifter circuit 622 boosts the video signal sent from the second-stage latch circuit 627 to a voltage capable of driving the output inverter circuit 623. Reference symbol VSH represents a power supply voltage line on the high voltage side of the buffer circuit 621, and reference symbol VSS represents a power supply voltage line on the low voltage side thereof.

The output inverter circuit 623 includes a plurality of inverter circuits having a voltage capable of driving liquid crystal molecules as a power supply voltage. The transistors constituting the output inverter circuit 623 have such a size that the load of the video signal line 25 can sufficiently be driven, and, for example, the channel width thereof is 300 μm or more, which is 70 times or more as large as the 5 V system power supply voltage transistors constituting the latch circuit unit 620.

Therefore, the flow-through voltage that flows through the output inverter circuit 623 at the moment when the switch circuit 635 is brought into conduction, becomes extremely high and becomes a burden on the power supply voltage circuit 370.

The video signal output circuit 600 spreads the load of the power supply voltage circuit 370 by shifting the timing with which the switch circuit 635 is brought into conduction. Specifically, the number of latch circuit units 620 is 240 (24 units×10 blocks). The liquid crystal display panel 10 is divided into two right and left panels, and the two panels are supplied with power supply voltages of two systems via the relay substrate 63 to shift the timing of output of 120 latch circuit units 620 on each of the right and left panels.

The video signal control circuit 310 generates a write signal whose timing is shifted for each of the latch circuit units 620 and outputs it to the write signal line 649.

The polarity signal output circuit 630 also has the problem of increasing the load of the power supply voltage circuit 370 remarkably. The polarity signals are output with different timings using the polarity signal shift register 650.

Since the liquid crystal display panel 10 is adaptable to the foregoing memory mode, it incorporates the polarity signal output circuit 630 and the polarity signal shift register 650 such that it can output a polarity signal from inside.

The polarity signal shift register 650 supplies timing signals in sequence to the polarity signal output circuit 630, and the polarity signal output circuit 630 outputs polarity signals in sequence at regular intervals. The polarity signal shift register 650 is formed of, for example, 240 stages, and 240 polarity signal output circuits 630 output polarity signals.

When all the polarity signal output circuits 630 provided in the liquid crystal display panel 10 output polarity signals at once, there is a problem that a large load is applied to the power supply voltage circuit 370 as in the case of the video signal output circuit 600 described above. Thus, the polarity signal shift register 650 outputs timing signals such that the polarity signal output circuits 630 output polarity signals with different timings, thereby dispersing and reducing the load applied to the power supply voltage circuit 370. As a specific configuration, for example, the number of stages of the polarity signal shift register 650 is set equal to the number of polarity signal output circuits 630 to output timing signals in sequence to the polarity signal output circuits 630 corresponding to the stages, with the result that the polarity signal output circuits 630 output the polarity signals with different timings.

Figure 10:
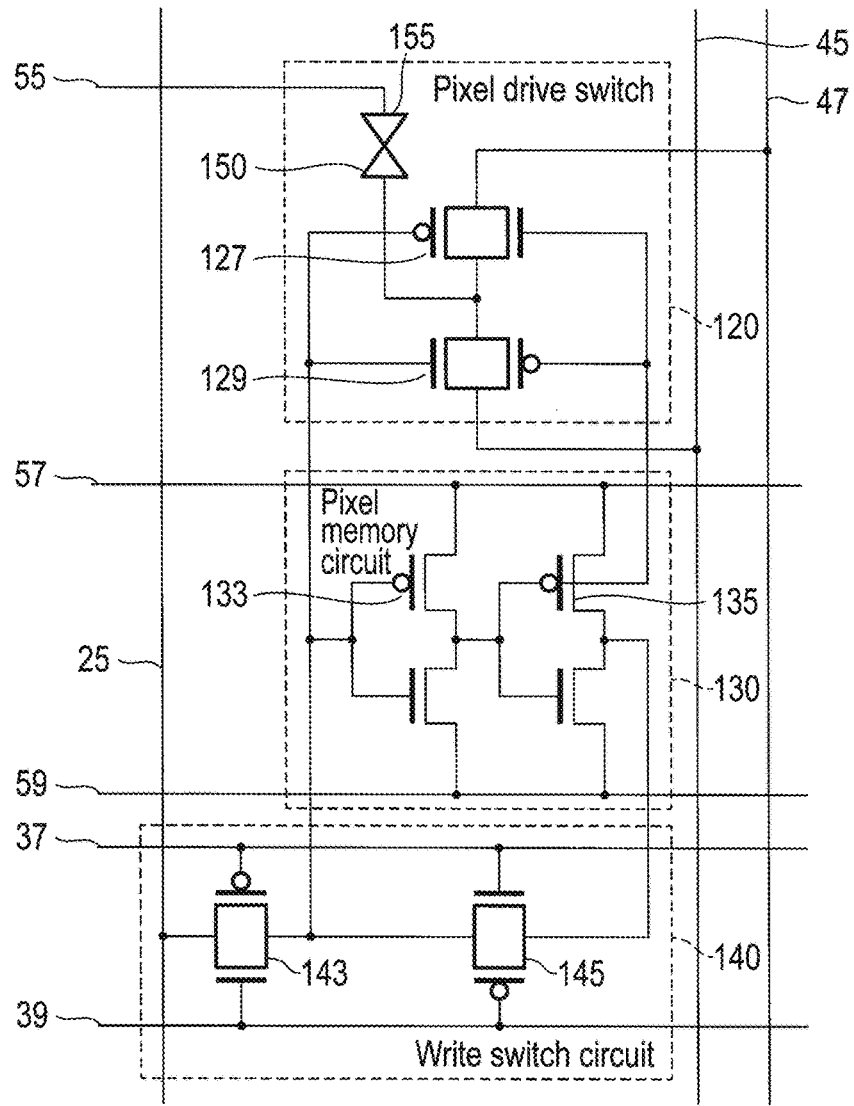
FIG. 10 is a diagram showing a pixel circuit of the display device of the embodiment.

FIG. 10 shows a pixel circuit. In FIG. 10, Reference numeral 120 denotes a pixel drive switch circuit, 130 denotes a pixel memory circuit, and 140 denotes a write switch circuit.

Reference numerals 37 and 39 denote write control signal lines, 45 denotes a polarity signal line, 47 denotes a reference voltage line, 55 denotes a common signal line, and 57 and 59 denote memory power supply lines.

The pixel memory circuit 130 includes inverter circuits 133 and 135 connected in series. The output of the inverter circuit 135 is connected to the input of the inverter circuit 133 through a transfer gate 145 of the write switch circuit 140.

The pixel memory circuit 130 configured as described above records input digital data (logical "1" or "0") for one bit. The digital data is thus supplied from the video signal line 25. When a transfer gate 143 is brought into conduction by the write control signal lines 37 and 39, digital data is input to the pixel memory circuit 130 to bring the transfer gate 143 into nonconduction. When the transfer gate 145 is brought into conduction, digital data is recorded in the pixel memory circuit 130.

When the output of the inverter circuit 133 of the pixel memory circuit 130 is "0" (a low voltage applied to the pixel memory circuit 130 through the memory power supply line 50), the transfer gate 129 of a pixel drive switch circuit 120 is brought into conduction to supply a polarity signal to the pixel electrode 150 via the polarity signal line 45. When the output of the inverter circuit 133 is "1" (a high voltage applied to the pixel memory circuit 130 through the memory power supply line 50), the transfer gate 127 of the pixel drive switch circuit 120 is brought into conduction to supply a reference signal to the pixel electrode 150 via the reference voltage line 47.

A common electrode 155 is formed opposite to the pixel electrode 150, and a liquid crystal composition is placed between the pixel electrode 150 and the common electrode 155. Display is made by changing the alignment direction of liquid crystal molecules due to a difference in potential between the pixel electrode 150 and the common electrode 155.

For example, display is black (the amount of transmitted light is small) when a difference in potential is caused between the pixel electrode 150 and the common electrode 155, liquid crystal molecules are aligned along an electric line of force between the pixel electrode 150 and the common electrode 155, the polarization direction of light transmitted through a liquid crystal composition is not changed, and the polarization directions of two polarizing elements sandwiching the liquid crystal composition are caused to cross each other. In addition, display is white (the amount of transmitted light is large) when a difference in potential is not caused between the pixel electrode 150 and the common electrode 155, liquid crystal molecules are twisted and aligned, and the polarization direction of light transmitted through a liquid crystal composition is rotated 90 degrees.

In the present embodiment, the difference in potential between the pixel electrode 150 and the common electrode 155 is set to about 5 V. In order to prevent a DC voltage from being continuously applied to the liquid crystal composition, the polarity of the voltage applied to the pixel electrode 150 is inverted in a constant cycle.

As an example, the voltage applied to the common electrode 155 may be 5 V, and the polarity signals applied to the pixel electrode 150 may be set to 0 V and 10 V. In this case, in order to bring the transfer gates 127 and 129 of the pixel drive switch circuit 120 into conduction, a power supply voltage of about 10 V is applied to the pixel memory circuit 130 through the memory power supply line 57, and a power supply voltage of about 0 V is applied thereto through the memory power supply line 59.

In addition, the high voltage of digital data supplied from the video signal line 25 is about 10 V, and the low voltage thereof is about 0 V.

Therefore, the power supply voltage of the output inverter circuit 623 described above is also about 10 V on the VSH side and it is also about 0 V on the VSS side.

The display device 1 is a reflective display device with a built-in memory, and has a display mode to make display using data recorded in the pixel memory circuit 130 by stopping the supply of digital data from the video signal line 25. In this case, the controller 300 shown in FIG. 1 stops the output of digital data to the video signal line 25 and maintains the output of a polarity signal.

Note that the controller 300 not only stops the output of digital data to the video signal line 25, but also stops the generation of digital data to be output to the video signal line 25. The reflective display device with a built-in memory of the present embodiment has sub-pixels 110 of four colors as described above, and each of the sub-pixels 110 displays 3-bit data with area gradations as will be described later. Since a generally-used display device has sub-pixels of three colors to display gradations using digital data of about 6 to 24 bits for each color, the controller 300 converts digital data of three bits or more into digital data of three bits and generates data for four colors from data of three colors.

Therefore, the controller 300 stops the video signal control circuit 310 in order to stop the supply of digital data. However, the video signal control circuit 310 includes the timing generation circuit 320, and when the video signal control circuit 310 is stopped, the output of the polarity signal is also stopped.

No power consumption can be reduced if the video signal control circuit 310 continues to operate in order to output a polarity signal. The controller 300 thus outputs a signal to control a polarity signal using the system control circuit 380.

The system control circuit 380 is configured by a micro control unit (MCU) with an output circuit. It controls the output circuit to output signals to control the polarity signal output circuit 630 and the polarity signal shift register 650.

FIG. 11 shows a signal for controlling the polarity signal shift register 650, which is output from the system control circuit 380 in the memory mode, and an output of the polarity signal output circuit 630. In the controller mode, the signal for controlling the polarity signal shift register 650 is output from the video signal control circuit 310.

Reference symbol STP represents a start signal, CKP denotes a clock signal, and POL indicates a polarity signal. The polarity signal POL is output in accordance with the start of output of the start signal STP. The polarity signal shift register 650 outputs a timing signal to control the polarity signal output circuit 630 in response to the clock signal CKP.

Reference symbol POLA1 represents the output of a first polarity signal output circuit 630, for example, the output of the leftmost polarity signal output circuit 630 in FIG. 6. The polarity signal shift register 650 outputs the timing signals of second to 240th polarity signal output circuits 630 in sequence.

The interval between outputs of the start signal STP can optionally be set. For example, the start signal STP is output at intervals of 8 seconds after the clock signal CKP is output 240 times. The output POLAn of an optional polarity signal output circuit 630 is maintained in accordance with the value of the polarity signal POL at the time of receiving a timing signal from the polarity signal shift register 650. The output is changed to the output corresponding to the value of the polarity signal POL in response to a timing signal from the polarity signal shift register 650 after 8 seconds.

Therefore, the outputs of the polarity signal output circuits 630 are not only changed in response to the timing signal from the polarity signal shift register 650, but also need to be maintained until the next timing signal is output.

FIG. 12 shows a circuit which changes the output of the polarity signal output circuit 630 in response to a timing signal from the polarity signal shift register 650 and maintains the output until the next timing signal is output, and FIG. 13 shows a timing chart of the circuit shown in FIG. 12.

In FIG. 12, reference numeral 651 denotes a register circuit in the n-th stage of the polarity signal shift register 650 including register circuits in a plurality of stages. Reference symbol IN represents an input signal from the preceding stage, and OUT represents the output of the register circuit 651 in the n-th stage. Reference numeral 690 denotes a memory circuit which inputs the value of the polarity signal POL to an inverter circuit 699 and outputs signal POLAn'.

The inverter circuits 699 and 693 form a memory circuit with a switching element 695 in conduction state. When the output OUT is a low voltage, an inverter circuit 653 outputs a high voltage, the switching element 695 is brought into conduction, and the inverter circuits 699 and 693 maintain the output.

When the output OUT of the register circuit 651 becomes a high voltage, the switching element 695 is brought into nonconduction, and a switching element 697 is brought into conduction. Accordingly, the value of the polarity signal POL is input to the inverter circuit 699. After that, when the output OUT becomes a low voltage, the polarity signal is brought into nonconduction, the switching element 695 is brought into conduction, and the inverter circuits 699 and 693 maintain the value of the polarity signal POL.

FIG. 14 is a block diagram of circuits around the pixels. In FIG. 14, four sub-pixels are arranged in two rows and two columns.

The write control signal lines 37 and 39 are arranged vertically in the figure with a write switch circuit 140 interposed therebetween. In FIG. 6, the write control signal lines 37 and 39 are collectively displayed as a single scanning line 35.

The memory power supply lines 57 and 59 are also arranged vertically with the pixel memory circuit 130 interposed therebetween. Accordingly, the memory power lines 57 and 59 are supplied from the right and left of the display area 20 shown in FIG. 6.

The video signal lines 25 extends two by two in the vertical direction in the drawing and are formed at intervals of two columns of sub-pixels.

The polarity signal line 45 and the reference voltage line 47 extend in the vertical direction of the display region 20, and are supplied with a polarity signal and a reference voltage from the lower side of the drawing. The polarity signal line 45 and the reference voltage line 47 are formed thicker than the video signal line 25 in order to enhance a voltage supply capacity.

Reference numeral 820 indicates a position of a through hole that connects the pixel drive switch circuit 120 and the pixel electrode 150.

The video signal supplied via the video signal line 25 is recorded in the pixel memory circuit 130 via the write switch circuit 140 that is brought into conduction by the write control signal lines 37 and 39. The pixel memory circuit 130 is supplied with a power supply voltage through the memory power supply lines 57 and 59, and the on/off of the pixel drive switch circuit 120 is controlled by the output of the pixel memory circuit 130.

The pixel drive switch circuit 120 applies a voltage, which is supplied by the polarity signal line 45 or the reference voltage line 47, to the pixel electrode 150 according to the output of the pixel memory circuit 130.

Figure 15:
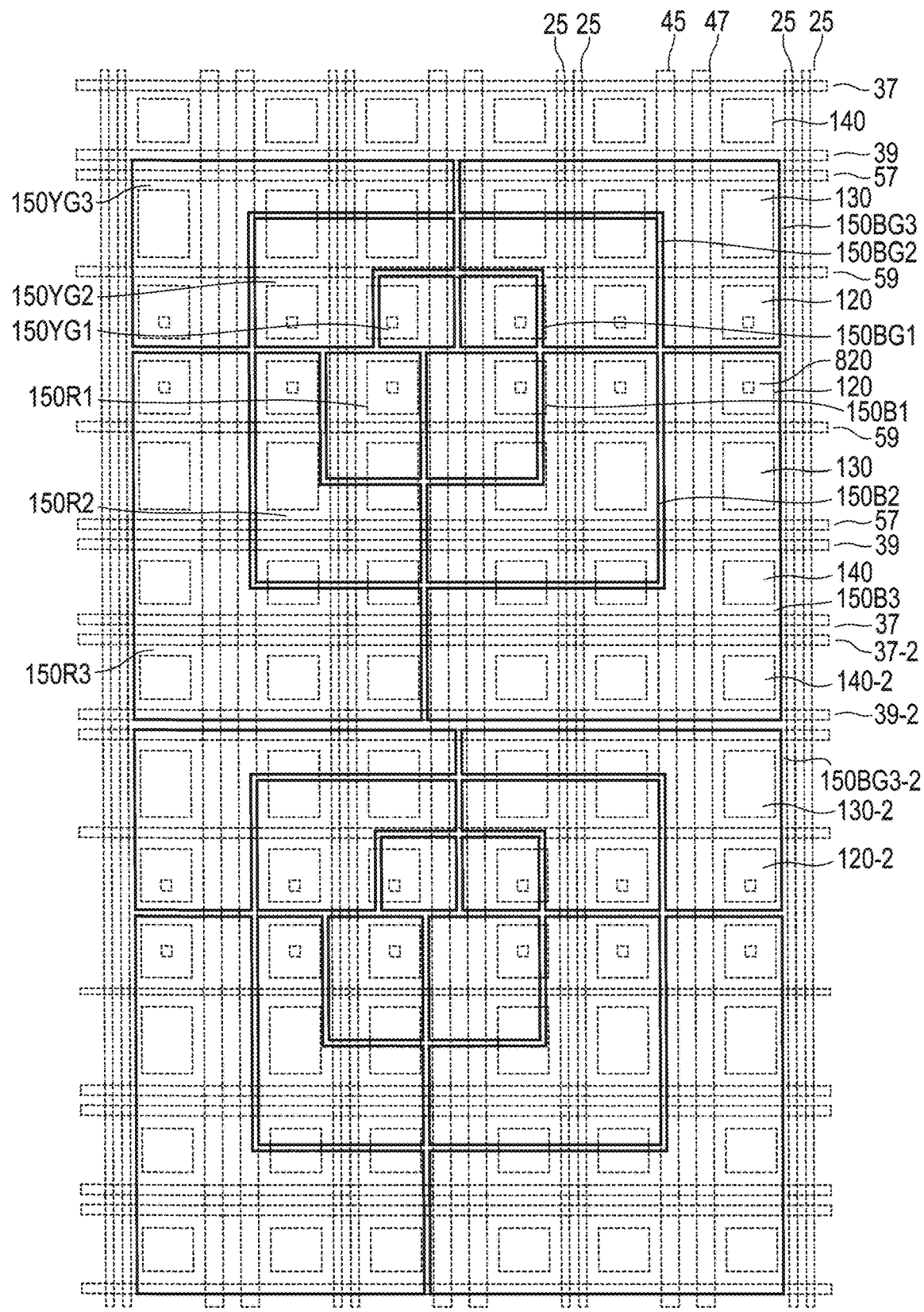
FIG. 15 is a diagram showing a first example of arrangement of pixel electrodes of the display device of the embodiment.

FIG. 15 shows the arrangement of pixel electrodes 150. In FIG. 15, two pixels are arranged vertically. In one of the pixels, pixel electrodes 150 of sub-pixels are formed to correspond to color filters of four colors. The sub-pixels of the colors are formed such that the areas of the pixel electrodes 150 are 1:2:4, and 3-bit digital data is displayed using area gradations.

In FIG. 15, 150R1, 150R2 and 150R3 represent pixel electrodes corresponding to a red color filter. A first bit value of three-bit red data (counted from the lower bit) is written to the pixel electrode 150R1. Similarly, a second bit value of the three-bit red data is written to the pixel electrode 150R2, and a third bit value of the three-bit red data is written to the pixel electrode 150R3.

Then, a first bit value of blue data is written to a pixel electrode 150B1, a second bit value of the blue data is written to the pixel electrode 150B2, and a third bit value of the blue data is written to the pixel electrode 150B3.

150YG1, 150YG2 and 150YG3, and 150BG1, 150BG2 and 150BG3 represent pixel electrodes to which values of green data are written. The pixel electrodes 150YG1, 150YG2 and 150YG3 and the pixel electrodes 150BG1, 150BG2 and 150BG3 correspond to color filters which transmit light of different wavelengths even though the light is the same green band light.

Although the pixel electrodes 150 are different in size in FIG. 15, the through holes 820 can be arranged at positions overlapping the pixel electrodes 150. For example, the area of the pixel electrode 150B2 is two times as large as that of the pixel electrode 150B1. The pixel electrode 150B2 temporarily extends downward from the position of the through hole 820, and is formed to overlap the pixel memory circuit 130 that drives the pixel electrode 150B2 itself. After that, it extends toward the position where it overlaps the pixel memory circuit 130 that drives the pixel electrode 150B1 (toward the left side in the figure).

Furthermore, the area of the pixel electrode 150B3 is four times as large as that of the pixel electrode 150B1. The pixel electrode 150B3 temporarily extends downward from the position of the through hole 820, and is formed to overlap the pixel memory circuit 130 and the write switch circuit 140 which drive the pixel electrode 150B3 itself. After that, it extends (toward the left side of the figure) to overlap a write switch circuit 140-2 that drives the pixel electrode 150BG1 from a write switch circuit 140-2 that drives a pixel electrode 150GB3 adjacent thereto (in the downward direction in the figure).

Figure 16:
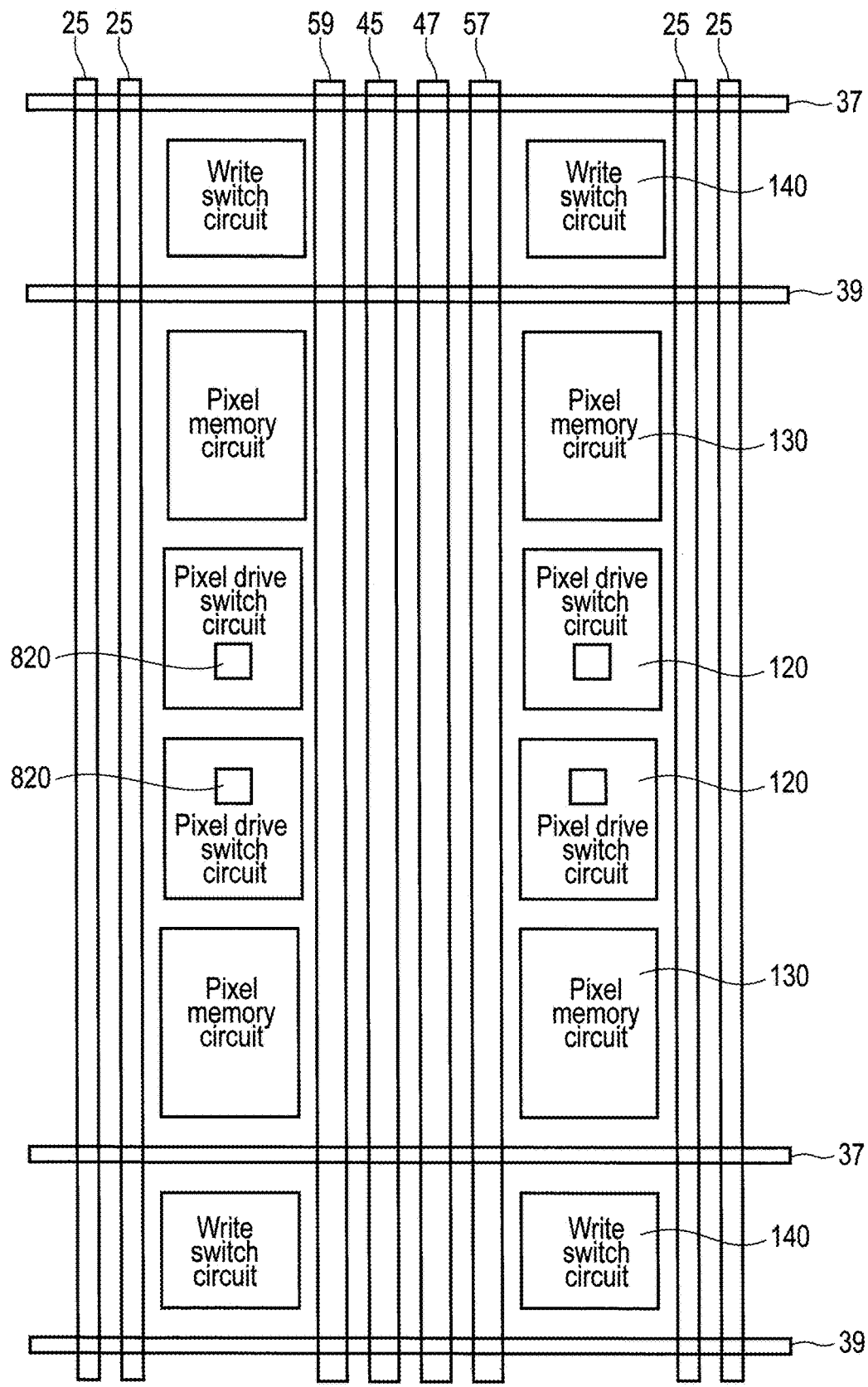
FIG. 16 is a diagram showing a second example of circuits around pixels of the display device of the embodiment.

FIG. 16 shows a configuration in which the memory power supply lines 57 and 59 are arranged to extend in the vertical direction along the polarity signal line 45 and the reference voltage line 47.

In the configuration shown in FIG. 14, the memory power supply lines 57 and 59 cross the video signal line 25 to form a coupling capacitance between them. If, therefore, the voltage of the video signal line 25 is amplified at, for example, 10 V on the high voltage side and 0 V on the low voltage side, there arises a problem that the potentials of the memory power supply lines 57 and 59 vary.

When the potentials of the memory power supply lines 57 and 59 vary, the voltage at which the pixel drive switch circuit 120 turns on and off, varies, and for example, the transfer gates 127 and 129 turn on simultaneously. As a result, the polarity signal line 45 and the reference voltage line 47 may be short-circuited to cause a display failure.

To avoid the display failure, the memory power supply lines 57 and 59 shown in FIG. 14 are arranged to extend vertically such that they do not cross the video signal line 25 as shown in FIG. 16.

When the memory power supply lines 57 and 59 are arranged to extend in the vertical direction in the figure, they can be formed of the same layer (same material) as a conductive layer composing the video signal line 25. In the configuration of the memory power supply lines 57 and 59 that cross the video signal line 25 as shown in FIG. 14, the memory power supply lines 57 and 59 are formed of the same conductive layer as that of the write control signal lines 37 and 39. Since the write control signal lines 37 and 39 are formed of a refractory metal such as MoW with a relatively high resistance and an alloy thereof for process reasons, whereas the video signal line 25 is formed of a low-resistance metal such as aluminum and an alloy thereof. The power supply capacity can thus be enhanced by forming the memory power supply lines 57 and 59 of a conductive layer whose resistance is lower than that of the write control signal lines 37 and 39.

The power supply capacity can also be enhanced by arranging the memory power supply lines 57 and 59 linearly and at a short distance from the input terminal 680 formed for each block.

Figure 17:
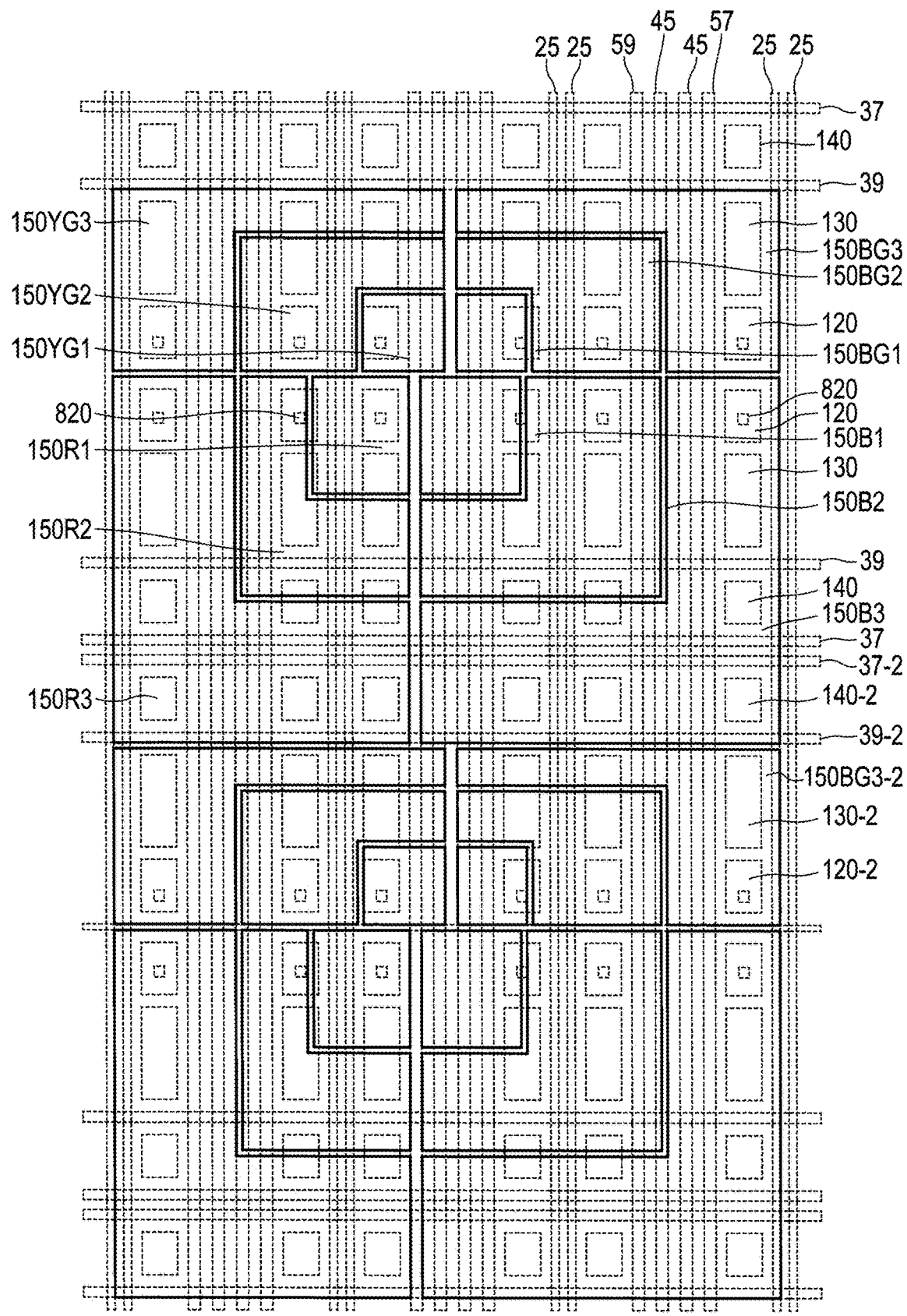
FIG. 17 is a diagram showing a second example of arrangement of pixel electrodes of the display device of the embodiment.

FIG. 17 shows the positions of reflecting electrodes when four memory power supply lines 57 and 59 are arranged along the polarity signal line 45 and the reference voltage line 47. In FIG. 17, two lines are added in the horizontal direction and thus the width of each circuit in the horizontal direction is reduced. Since the width of each circuit is reduced, there arises a problem that the position where the through hole 820 connecting the pixel drive switch circuit 120 and the pixel electrode 150 is formed is, becomes closer to an end portion of the pixel electrode 150.

For example, a through hole 820 that connects the pixel drive switch 120 and the pixel electrode 150B1 to which a first-bit value of green data is written, is closer to an end portion of the pixel electrode 150B1. It is thus necessary to move the position of the through hole 820.

Figure 18:
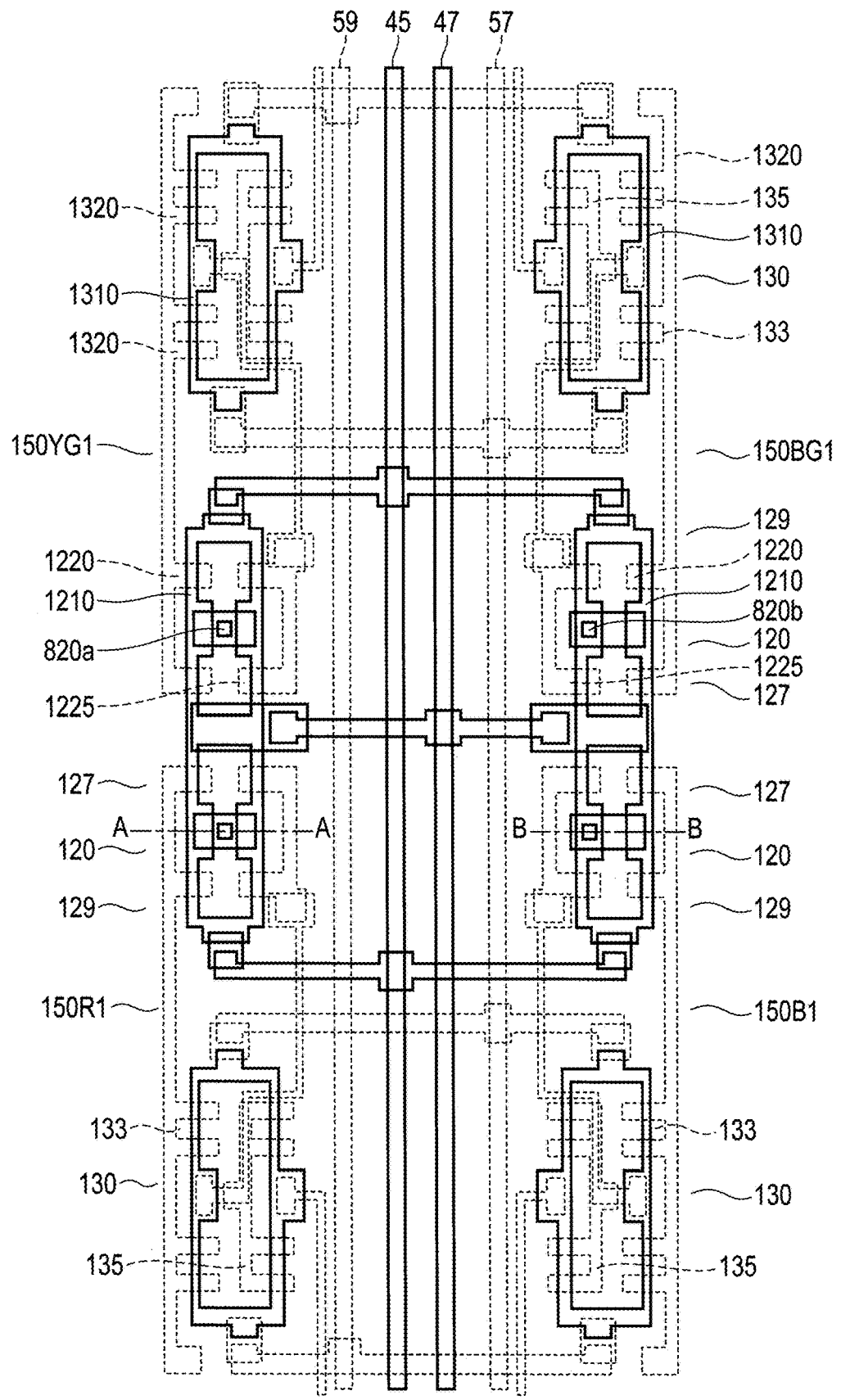
FIG. 18 is a diagram showing a layout of a circuit to describe the position of a through hole in the display device of the embodiment.

FIG. 18 shows a layout of the pixel drive switch circuit 120 and the pixel memory circuit 130 in order to describe the position of the through hole 820. In FIG. 18, the upper left corresponds to the pixel electrode 150YG1, the upper right corresponds to the pixel electrode 150BG1, the lower left corresponds to the pixel electrode 150R1, and the lower right corresponds to the pixel electrode 150B1.

The pixel memory circuit 130 includes inverter circuits 133 and 135, and a semiconductor layer 1310 is formed like a ring common to the inverter circuits 133 and 135. The output of the inverter circuit 133 is connected to the input of the inverter circuit 135. The inverter circuit 133 includes a gate electrode 1320 that is connected to one gate electrode 1220 of the transfer gates 127 and 129. The output of the inverter circuit 133 and the input of the inverter circuit 135 are connected to the other gate electrode 1225 of the transfer gates 127 and 129.

In the pixel drive switch circuit 120, too, a semiconductor layer 1210 is formed like a ring. In the pixel drive switch circuit 120 corresponding to the pixel electrodes 150YG1 and 150R1, a through hole 820a is formed in the hole of the ring of the semiconductor layer 1210 so as not to overlap the semiconductor layer 1210. In contrast, in the pixel drive switch circuit 120 corresponding to the pixel electrodes 150BG1 and 150B1, a through hole 820b moves from the center of the ring of the semiconductor layer 1210 toward the pixel electrodes 150YG1 and 150R1, and is formed in a position where it overlaps the semiconductor layer 1210.

Since the through hole 820b is moved to a position where it overlaps the semiconductor layer 1210, it is possible to have a tolerance in a position where the pixel electrodes 150BG1 and 150B1 are connected to each other.

Figure 19:
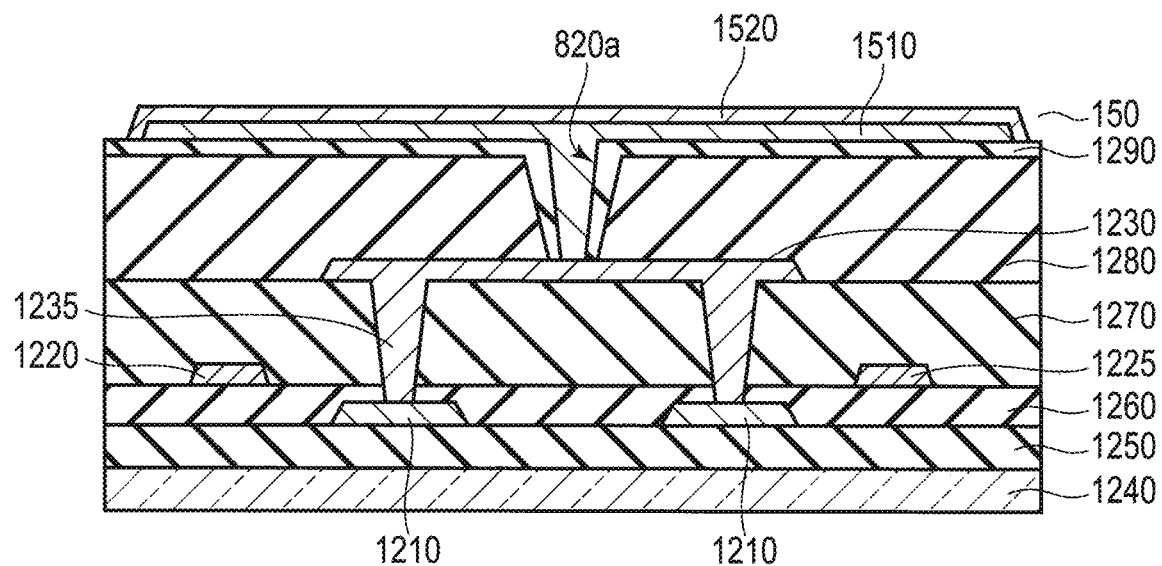
FIG. 19 is a first cross-sectional view (A-A) of the circuit of FIG. 18.

FIG. 19 is a cross-sectional view taken along line A-A of FIG. 18. The pixel electrode 150 is formed of a reflecting electrode 1510 made of aluminum or the like and a transparent electrode 1520 made of ITO or the like so as to cover the reflecting electrode 1510.

Reference numeral 1240 denotes a substrate formed of glass, resin or the like. An underlayer film 1250 formed of SiO or SiN is formed on the substrate 1240, and the ring-shaped semiconductor layer 1210 is formed on the underlayer film 1250. An insulating film 1260 is formed on the semiconductor layer 1210, and gate electrodes 1220 and 1225 of the pixel drive switch circuit 120 are formed on the insulating film 1260.

An insulating film 1270 is formed on the gate electrodes 1220 and 1225, and a relay electrode 1230 is formed on the insulating film 1270. A through hole 1235 is formed in the insulating films 1270 and 1260 to connect the relay electrode 1230 with the gate electrodes 1220 and 1225.

An insulating film 1280 is formed on the relay electrode 1230, and the through hole 820a is formed in the insulating film 1280 to connect the relay electrode 1230 and the reflecting electrode 1510.

Figure 20:
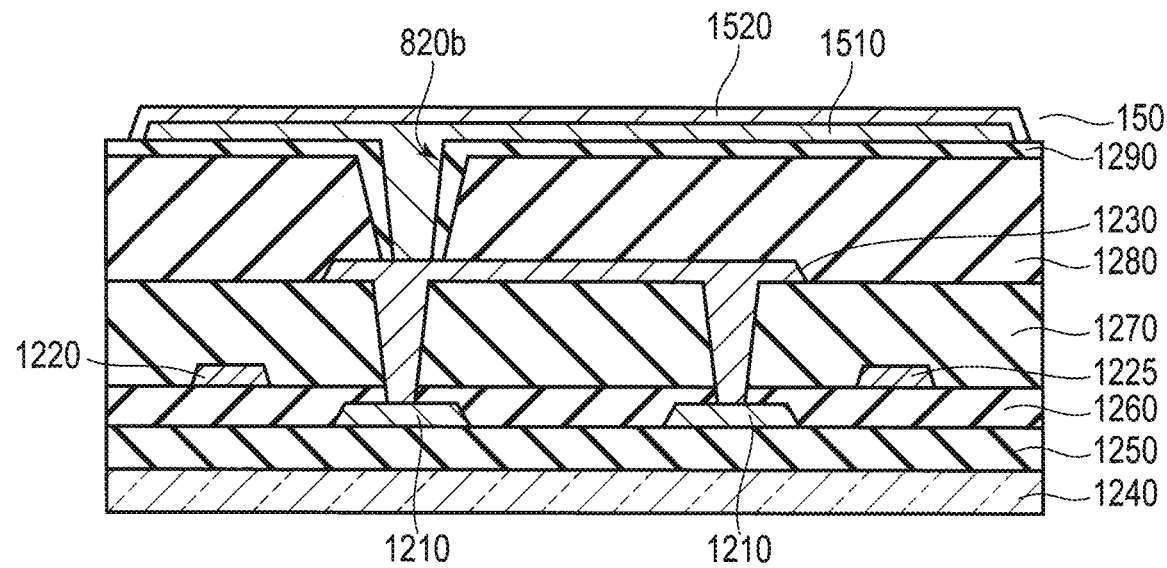
FIG. 20 is a second cross-sectional view (B-B) of the circuit of FIG. 18.

In the cross-sectional view of FIG. 19, the through hole 820a is formed near the midpoint between the ring-shaped semiconductor layers 1210, whereas in the cross-sectional view of FIG. 20, taken along line B-B of FIG. 18, the through hole 820b is formed in a position shifted from the midpoint to one of the ring-shaped semiconductor layers 1210 so as to overlap the one of the semiconductor layers 1210.

As described above, according to the present embodiment, the relay substrate 63 and the controller 300 are provided with line patterns to determine a connecting state of a plurality of FFCs to reduce the risk that the liquid crystal display panel 10 is damaged due to a connection failure of the FFCs. In other words, according to the present embodiment, it is possible to provide a liquid crystal display device capable of determining a connecting state of a plurality of cables which connect substrates, for example.

All display devices which can be changed as appropriate and reduced to practice by those skilled in the art on the basis of the display device described above as an embodiment of the present invention also fall within the scope of the present invention as long as they cover the subject matter of the present invention.

In the scope of the concept of the present invention, those skill in the art are could conceive various changes and modifications and understand that the changes and modifications also fall within the scope of the present invention.

When those skilled in the art add a structural element to the foregoing embodiment, delete a structural element therefrom or change a structural element thereof as appropriate, or when they add a step to the foregoing embodiment, delete a step therefrom or change a condition thereof, these addition, deletion and change fall within the scope of the present invention as long as they have the spirit of the present invention.

In addition, other advantages brought about from the aspect described in the present embodiment, which are clear from the descriptions of the specification, or which are appropriately conceivable to those skilled in the art, are naturally brought about by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a liquid crystal panel;
a controller configured to control the liquid crystal panel;
a relay substrate provided between the liquid crystal panel and the controller; and
a light emitting diode (LED), wherein:
the relay substrate and the controller are connected by a plurality of cables;
the relay substrate comprises a plurality of first connectors to which one end of the cables is connected;
the controller comprises:
a microcomputer; and
a plurality of second connectors which are paired with the first connectors and to which the other end of each of the cables is connected;
the relay substrate and the controller comprise a line pattern to form a test circuit which feeds a test signal back to an input pin of the microcomputer from an output pin of the microcomputer, and which transfers the test signal from the controller to the relay substrate and returns the test signal from the relay substrate to the controller in each pair of the first connectors and the second connectors;
the microcomputer is configured to output the test signal from the output pin, and to determine a connecting state of the cables that connect the relay substrate and the controller based on a state of feedback of the test signal to the input pin; and
the LED is turned on to report a connection failure of the cables.

2. The liquid crystal display of claim 1, wherein:
the plurality of cables are flat flexible cables;
the plurality of first connectors and the plurality of second connectors are flat flexible cable connectors; and
the line pattern forms the test circuit such that the test signal is transferred from the controller to the relay substrate and returned from the relay substrate to the controller, using first and last ones of signal lines arranged in line in the cables that are flat flexible cables, in each pair of the first connectors and the second connectors.

3. The liquid crystal display of claim 2, wherein the microcomputer is configured to output an optional pulse waveform from the output pin as the test signal, and to determine a connecting state of the cables according to whether or not the optional pulse waveform is fed back to the input pin with a specific timing.

4. The liquid crystal display of claim 3, wherein the microcomputer is configured to repeat, a predetermined number of times, outputting the optional pulse waveform from the output pin and determining whether or not the optional pulse waveform is fed back to the input pin with a specific timing, and to determine that the cables are normally connected when it is confirmed that the optional pulse waveform is fed back to the input pin with the specific timing in all of the determinations repeated a predetermined number of times.

5. The liquid crystal display of claim 1, wherein the microcomputer is configured to output an optional pulse waveform from the output pin as the test signal, and to determine a connecting state of the cables according to whether or not the optional pulse waveform is fed back to the input pin with a specific timing.

6. The liquid crystal display of claim 5, wherein the microcomputer is configured to repeat, a predetermined number of times, outputting the optional pulse waveform from the output pin and determining whether or not the optional pulse waveform is fed back to the input pin with a specific timing, and to determine that the cables are normally connected when it is confirmed that the optional pulse waveform is fed back to the input pin with the specific timing in all of the determinations repeated a predetermined number of times.

7. A liquid crystal display device comprising:
a first substrate;
a second substrate; and
a light emitting diode (LED), wherein:
the first substrate comprises a plurality of first connectors to which one end of each of a plurality cables is connected;
the second substrate comprises:
a microcomputer; and
a plurality of second connectors which are paired with the first connectors and to which the other end of each of the cables is connected;
the first substrate and the second substrate comprise a line pattern to form a test circuit which feeds a test signal back to an input pin of the microcomputer from an output pin of the microcomputer, and which transfers the test signal from the second substrate to the first substrate and returns the test signal from the first substrate to the second substrate in each pair of the first connectors and the second connectors;
the microcomputer is configured to output the test signal from the output pin, and to determine a connecting state of the cables that connect the first substrate and the second substrate based on a state of feedback of the test signal to the input pin; and
the LED is turned on to report a connection failure of the cables.

* * * * *